(12) United States Patent
Tran et al.

(10) Patent No.: US 9,597,961 B2
(45) Date of Patent: *Mar. 21, 2017

(54) WADING VEHICLE WATER LEVEL DISPLAY

(75) Inventors: Thuy-Yung Tran, Rugby (GB); Edward Hoare, Malvern (GB); Anthony Jones, Risca (GB); Simon Thomson, Coventry (GB); Ashutosh Tomar, Coventry (GB); Sebastian Paszkowicz, Coventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 213 days.

This patent is subject to a terminal disclaimer.

(21) Appl. No.: 13/994,581

(22) PCT Filed: Dec. 15, 2011

(86) PCT No.: PCT/EP2011/072994
§ 371 (c)(1),
(2), (4) Date: May 27, 2014

(87) PCT Pub. No.: WO2012/080435
PCT Pub. Date: Jun. 21, 2012

(65) Prior Publication Data
US 2014/0347178 A1    Nov. 27, 2014

(30) Foreign Application Priority Data

Dec. 15, 2010 (GB) .................................. 1021268.6
Dec. 15, 2010 (GB) .................................. 1021272.8
(Continued)

(51) Int. Cl.
*G08B 21/00* (2006.01)
*B60Q 1/00* (2006.01)
(Continued)

(52) U.S. Cl.
CPC ............ *B60K 35/00* (2013.01); *B60G 17/019* (2013.01); *B60G 17/0165* (2013.01);
(Continued)

(58) Field of Classification Search
CPC ...... B62D 15/025; G08G 1/166; G08G 1/167; B60K 35/00; B60Q 5/008
(Continued)

(56) References Cited

U.S. PATENT DOCUMENTS 3,392,694 A  7/1968  Appleton
4,107,994 A  8/1978  Sogo
(Continued)

FOREIGN PATENT DOCUMENTS

DE           19941126 A1  4/2001
DE    102004028157 B3    1/2006
(Continued)

OTHER PUBLICATIONS

International Search Report for PCT/EP2011/072994 dated May 29, 2012, 6 pages.

*Primary Examiner* — Jack K Wang
(74) *Attorney, Agent, or Firm* — Reising Ethington P.C.

(57) ABSTRACT

A vehicle (100) comprising a wading information display (1020) and a wading depth sensor, the display showing an elevation of a vehicle on which is superimposed the current wading depth. The display may also indicate simultaneously the maximum wading depth calculated according to the ride height of the vehicle, the inclination of the vehicle by inclination of the displayed elevation, and an advisory speed according to wading depth and/or vehicle inclination.

11 Claims, 23 Drawing Sheets

(30) Foreign Application Priority Data

| Dec. 15, 2010 | (GB) | 1021278.5 |
|---|---|---|
| Dec. 15, 2010 | (GB) | 1021295.9 |
| Dec. 15, 2010 | (GB) | 1021296.7 |
| Dec. 15, 2010 | (GB) | 1021297.5 |

(51) Int. Cl.

| B60K 35/00 | (2006.01) |
|---|---|
| G01F 23/28 | (2006.01) |
| B60G 17/019 | (2006.01) |
| G01F 23/18 | (2006.01) |
| B60G 17/0165 | (2006.01) |
| B60W 40/06 | (2012.01) |
| B60W 40/076 | (2012.01) |
| B60W 50/14 | (2012.01) |
| B60K 37/02 | (2006.01) |
| F02D 11/10 | (2006.01) |
| G01F 23/14 | (2006.01) |
| G01S 15/02 | (2006.01) |
| G10K 13/00 | (2006.01) |
| B60R 99/00 | (2009.01) |
| G01F 23/24 | (2006.01) |
| G01F 23/26 | (2006.01) |
| G06F 7/00 | (2006.01) |
| G01K 13/00 | (2006.01) |
| G01S 15/93 | (2006.01) |
| G01S 15/87 | (2006.01) |
| B60R 25/10 | (2013.01) |
| G01S 15/00 | (2006.01) |
| G01F 23/00 | (2006.01) |
| G01F 23/296 | (2006.01) |

(52) U.S. Cl.
CPC ........ *B60G 17/01908* (2013.01); *B60K 37/02* (2013.01); *B60Q 1/00* (2013.01); *B60R 99/00* (2013.01); *B60W 40/06* (2013.01); *B60W 40/076* (2013.01); *B60W 50/14* (2013.01); *F02D 11/105* (2013.01); *G01F 23/0061* (2013.01); *G01F 23/0076* (2013.01); *G01F 23/14* (2013.01); *G01F 23/18* (2013.01); *G01F 23/24* (2013.01); *G01F 23/242* (2013.01); *G01F 23/263* (2013.01); *G01F 23/265* (2013.01); *G01F 23/28* (2013.01); *G01F 23/2965* (2013.01); *G01K 13/00* (2013.01); *G01S 15/02* (2013.01); *G01S 15/87* (2013.01); *G01S 15/931* (2013.01); *G06F 7/00* (2013.01); *G10K 13/00* (2013.01); *B60G 2300/07* (2013.01); *B60G 2400/80* (2013.01); *B60G 2400/843* (2013.01); *B60G 2500/30* (2013.01); *B60G 2800/914* (2013.01); *B60K 2350/1076* (2013.01); *B60W 2050/146* (2013.01); *B60W 2420/54* (2013.01); *B60W 2520/16* (2013.01); *B60W 2520/18* (2013.01); *B60W 2550/14* (2013.01); *B60W 2550/142* (2013.01); *B60W 2550/147* (2013.01); *G01F 23/00* (2013.01); *G01F 23/296* (2013.01); *G01S 2015/932* (2013.01); *G01S 2015/938* (2013.01); *Y02T 10/84* (2013.01); *Y10S 367/908* (2013.01); *Y10S 903/93* (2013.01)

(58) Field of Classification Search
USPC .............. 340/438, 425.5; 701/116, 112
See application file for complete search history.

(56) References Cited

U.S. PATENT DOCUMENTS

| 4,144,517 | A | 3/1979 | Baumoel | |
|---|---|---|---|---|
| 5,173,692 | A | 12/1992 | Shapiro et al. | |
| 5,521,594 | A | 5/1996 | Fukushima | |
| 5,978,736 | A | 11/1999 | Greendale | |
| 6,430,985 | B1 | 8/2002 | Drees | |
| 6,650,244 | B1 * | 11/2003 | Chen | G08B 21/20 |
| | | | | 340/425.5 |
| 8,473,173 | B1 | 6/2013 | Robles | |
| 9,026,310 | B2 | 5/2015 | Tran et al. | |
| 2003/0005765 | A1 | 1/2003 | Brudis et al. | |
| 2005/0170710 | A1 | 8/2005 | Darby et al. | |
| 2005/0284218 | A1 | 12/2005 | Lagergren | |
| 2006/0113129 | A1 | 6/2006 | Tabata | |
| 2007/0007056 | A1 | 1/2007 | Bowers et al. | |
| 2007/0167092 | A1 | 7/2007 | Rees et al. | |
| 2007/0221430 | A1 | 9/2007 | Allison, Sr. | |
| 2007/0244606 | A1 | 10/2007 | Zhang et al. | |
| 2008/0030313 | A1 | 2/2008 | Obradovich | |
| 2008/0251000 | A1 * | 10/2008 | Blakesley | B63B 21/00 |
| | | | | 114/293 |
| 2008/0319618 | A1 | 12/2008 | Sjogren et al. | |
| 2009/0030581 | A1 | 1/2009 | Pollklas et al. | |
| 2009/0150035 | A1 | 6/2009 | Soliman et al. | |
| 2009/0159020 | A1 * | 6/2009 | Hall | F01P 5/04 |
| | | | | 123/41.11 |
| 2010/0057324 | A1 | 3/2010 | Glugla et al. | |
| 2010/0085198 | A1 * | 4/2010 | Boss | G01F 23/0007 |
| | | | | 340/618 |
| 2010/0101226 | A1 | 4/2010 | Shutty et al. | |
| 2010/0112387 | A1 | 5/2010 | Nagasawa | |
| 2010/0328055 | A1 * | 12/2010 | Fong | B60Q 9/005 |
| | | | | 340/425.5 |
| 2012/0232719 | A1 * | 9/2012 | Salmon | G05D 1/0206 |
| | | | | 701/2 |
| 2013/0307679 | A1 | 11/2013 | Tran et al. | |
| 2013/0336090 | A1 | 12/2013 | Tran et al. | |
| 2014/0085066 | A1 | 3/2014 | Tran et al. | |
| 2014/0156126 | A1 | 6/2014 | Tran et al. | |
| 2014/0184247 | A1 | 7/2014 | Tran et al. | |
| 2014/0288793 | A1 | 9/2014 | Tran et al. | |
| 2014/0293746 | A1 | 10/2014 | Tran et al. | |
| 2015/0033846 | A1 | 2/2015 | Tran et al. | |

FOREIGN PATENT DOCUMENTS

| DE | 102005038345 A1 | 2/2007 |
|---|---|---|
| DE | 102008042016 A1 | 3/2010 |
| FR | 2622639 A1 | 5/1989 |
| GB | 2356602 A | 5/2001 |
| GB | 2376929 A | 12/2002 |
| KR | 20110109614 A | 10/2011 |
| KR | 20110109618 A | 10/2011 |
| NL | 1011780 C2 | 10/2000 |
| RU | 2168419 C1 | 6/2001 |
| WO | 03002378 A1 | 1/2003 |
| WO | 2009013606 A2 | 1/2009 |

\* cited by examiner

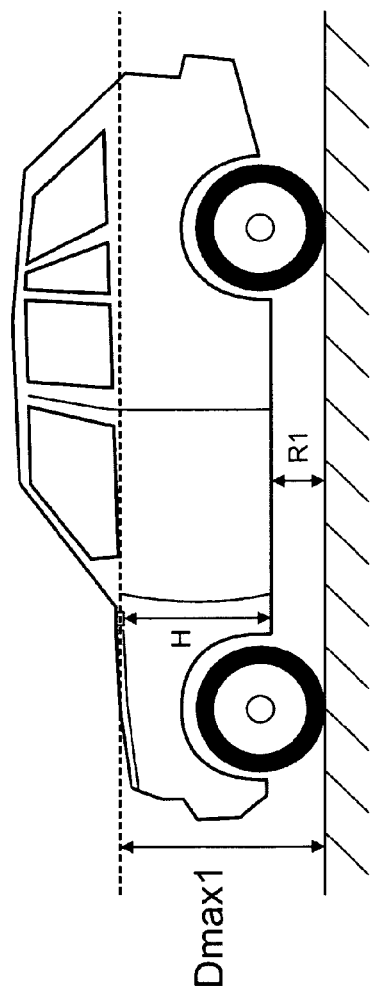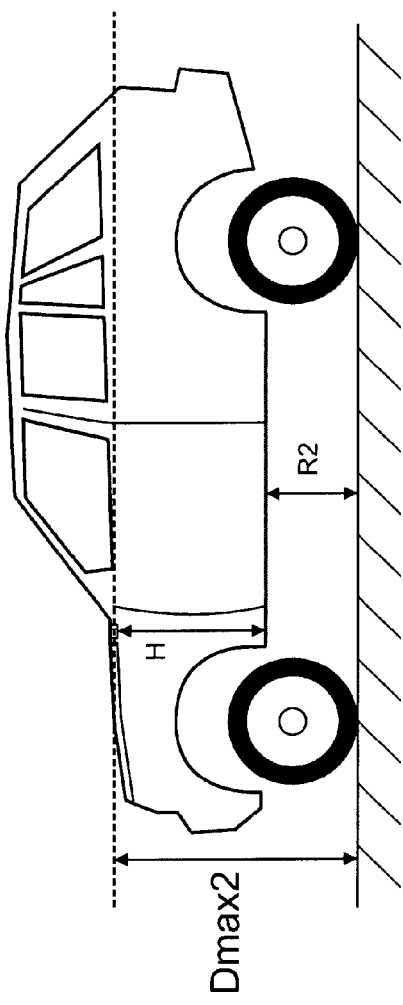

WADING VEHICLE WATER LEVEL DISPLAY

TECHNICAL FIELD

The present invention is concerned with a human machine interface for displaying the water level relative to a vehicle body. More particularly, but not exclusively, the present invention is concerned with display of the water level of a wading vehicle and providing such information to a driver of the vehicle. Aspects of the invention relate to vehicle comprising a wading information display, a method and a system.

BACKGROUND

An off-road vehicle may be defined as a road vehicle having some off road capability—such as the provision of all wheel drive. Off road vehicles are often required to travel through water to reach their intended destination. Travel through deep water (typically over about 0.3 m in depth) is known as "wading". Known off-road vehicles are design to wade, and comprise suitably sealed closures to avoid ingress of water into the passenger compartment. The engine air intake is positioned at an elevated position (normally directly in front of and below the windscreen) to prevent water being ingested into the engine, and this intake will often dictate the maximum level of water relative to the body that the vehicle can wade through.

Prior art methods of determining if the water level is safe to wade through include referring to depth gauges, e.g. permanent graduated poles situated within the water in the case of fords and measurement of the depth by the driver using a partially submerged stick or pole.

As discussed, the maximum wading depth is determined by the position of a point on the vehicle body (e.g. the engine air intake). Because the ride height of the vehicle is often variable (due to the variable height of the suspension system) the permissible absolute depth of water which the vehicle can wade through varies depending on the selected ride height of the suspension system.

The behaviour of the water around a wading vehicle is influenced by the vehicle's speed. The driver will typically want to travel as fast as possible (to reach a destination) but high speed travel whilst wading is not advisable. Waves from the vehicle may damage surrounding structures (and lap over e.g. flood defences) and excessive speed may cause waves to lap over the vehicle itself, entering e.g. the engine air intake. Evidently the maximum speed at which the wading vehicle can travel whilst avoiding these effects depends on factors such as water depth and pitch of the ground surface, but unless the driver is highly experienced in wading there is a significant risk that the maximum speed may be exceeded for a given set of wading conditions. Very low speed wading may be indicated in urban environments to avoid damage due to the vehicle's wash.

An aim of the present invention is to at least mitigate the above mentioned problems by providing better information to the driver.

SUMMARY

Aspects of the invention relate to vehicle comprising a wading information display, a method and a system as claimed in the appended claims.

According to an aspect of the present invention for which protection is sought there is provided a vehicle comprising means for determining a depth of water through which the vehicle is wading and a display configured to indicate the current water level.

In one embodiment the display comprises an elevation of the vehicle on which is indicated the current wading depth, typically in the form of a line or a colour wash. By "elevation" is meant an image, picture or other representation. The display may further illustrate the water level by reference to an icon on the display at the water level, for example a duck icon having the appearance of floating on the line or colour wash. In one embodiment the water level is displayed in increments which decrease as the wading depth approaches the maximum wading depth.

Wading depth can be provided to a vehicle control unit from any suitably enabled sensor, or by reference to topographical data and information about vehicle position, for example from GPS.

The decrease in increment size means that the display will provide increasingly accurate readings to the driver as the maximum level approaches. This is beneficial because the water level is far more critical as it approaches the permitted maximum. Displaying larger increments at lower depth levels prevents the display causing an unnecessary distraction with frequent non-critical updates, according to the refresh rate of the system.

The information may also be configured to advise the driver of the activation of relevant driving aids such as adjustment of ride height to a maximum, or activation of an off-road mode. It may also offer advice in message form, such as advice to check that the water exit is clear.

In an embodiment of the present invention there is provided a memory and a processor, the memory containing a program configured to run on the processor to calculate the maximum wading depth of the vehicle from the vehicle ride height, and to display the maximum wading depth on the display.

Advantageously, an accurate display of maximum wading depth can be displayed which accounts for variable height suspension. The driver can then make an informed decision on whether to enter or continue thorough water of a known depth (the depth being known from a roadside gauge, or measured by the driver or onboard vehicle systems).

The display may comprise an elevation of the vehicle on which is superimposed a line indicative of maximum wading depth. The position of the line on the vehicle may change according to a selected vehicle ride height.

In an embodiment both maximum wading depth and real time wading depth are simultaneously displayed, for example by reference to a vehicle elevation. The elevation may be front/rear and/or from the side, and driver selectable or simultaneous.

The maximum wading depth may be adjusted depending on the movement and or orientation of the vehicle. For example, when travelling forward the maximum depth may be the height of the engine intake. When travelling rearwardly at a negative inclination (e.g. down a slipway) the maximum depth may be the bottom of the tailgate glazing.

The display may for example show an elevation of the vehicle at the real time pitch or roll angle, with superimposed lines or colour washes indicative of maximum wading depth, and actual wading depth.

In one embodiment of the present invention, the memory contains a program configured to run on the processor to calculate an advised maximum wading speed of the vehicle from at least one of (i) the water level through which the vehicle is wading, (ii) the pitch of the vehicle and (iii) the angle of the terrain on which the vehicle is travelling, and to display the advised maximum wading speed on the display.

The provision of an advised maximum wading speed assists the driver in minimising any damage due to excessive speed.

The advised maximum speed may be displayed in a dedicated display area on the dashboard. Optionally, the advised maximum speed may be displayed or overlaid on the vehicle speedometer.

According to another aspect of the present invention for which protection is sought, there is provided a method of displaying current wading depth of a vehicle to a vehicle driver and comprising the steps of determining wading depth from a wading sensor, and displaying an elevation of a vehicle on which is superimposed the current wading depth.

The method may further comprise the steps of calculating the maximum wading depth of the vehicle according to the ride height thereof, and displaying on said elevation a superimposed indication of maximum wading depth.

Optionally, the method further includes the step of simultaneously displaying on said elevation an advisory speed for the vehicle, said speed being determined according to the wading depth indicated by a wading depth sensor.

In some embodiments the method includes the step of adjusting said advisory speed according to the inclination of the vehicle indicated by an inclination sensor thereof.

According to still another aspect of the present invention for which protection is sought, there is provided a wading vehicle system comprising a wading information display comprising an elevation of a vehicle and a wading depth indicator, said display showing the current water level on said elevation.

According to a further aspect of the present invention for which protection is sought, there is provided a computer program stored on a memory device for execution on a processor, the program comprising: determining the current wading depth of a vehicle from data provided by means of a wading sensor; and displaying an elevation of the vehicle on which is superimposed the current wading depth.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Embodiments of the present invention will now be described, by way of example only, with reference to the accompanying Figures in which:

FIG. 2 is a side view of the vehicle of FIG. 1 wading with a first suspension ride height;

FIG. 3 is a side view of the vehicle of FIG. 1 wading with a second suspension ride height;

DETAILED DESCRIPTION

Figure 1:
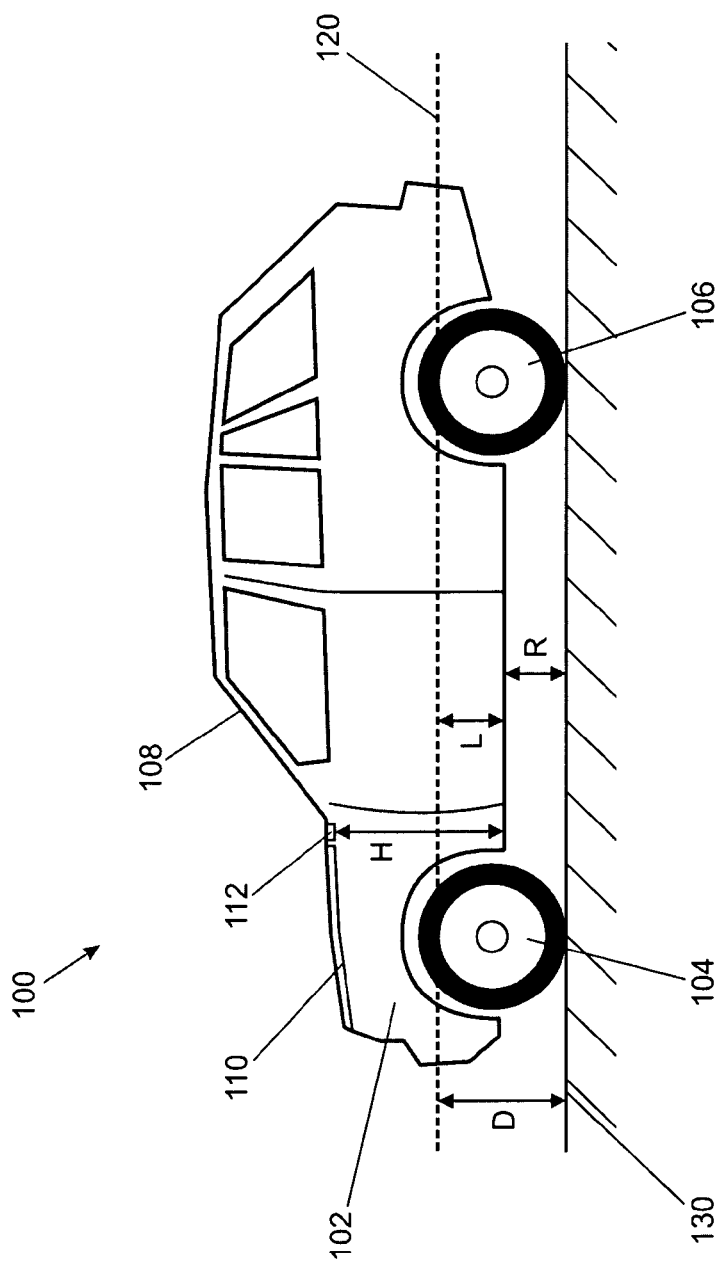
FIG. 1 is a schematic side view of a wading off-road vehicle according to embodiments of the present invention.

Referring to FIG. 1, a vehicle 100 comprises a body 102, a left front wheel 104 and a left rear wheel 106. The wheels 104, 106 (and their counterparts on the right hand side of the vehicle 100) are connected to the body 102 via a suspension (not shown). Each of the wheels 104, 106 comprises a tyre.

The wheels 104, 106 can move relative to the body 102 to define a ride height R between the lowermost point of the tyres (where they contact the ground) and the lowermost point on the body. The ride height R varies with suspension travel and may be varied by the driver (for example to move from an on-road mode when R is small to an off-road mode when R is large).

The body 102 comprises a windscreen 108 and a bonnet (or hood) 110 covering an engine bay. On the body 102 between the windscreen 108 and the bonnet 110 there is defined and engine intake orifice 112. The orifice 112 is connected to an air filter and intake manifold of the engine (not shown). The intake orifice 112 is positioned at a height H from the lowermost part of the body 102.

The vehicle 100 is shown wading through water 120 at a water depth D from a ground level 130. The water depth D should be distinguished from the water level represented by L which is the level of the water 120 above the lowermost point on the body 102.

It will be noted that although D can be measured (by a roadside gauge or a measuring stick); the distance L is generally unknown (as R can vary).

Turning to FIGS. 2 and 3, the vehicle 100 is shown having a first ride height R1 in FIG. 2 and a second, larger, ride height R2 in FIG. 3. Referring to FIG. 1, the maximum depth of water 120 until the intake orifice 112 becomes wet is Dmax1=R1+H. In FIG. 2 it is Dmax2=R2+H.

Figure 4A:
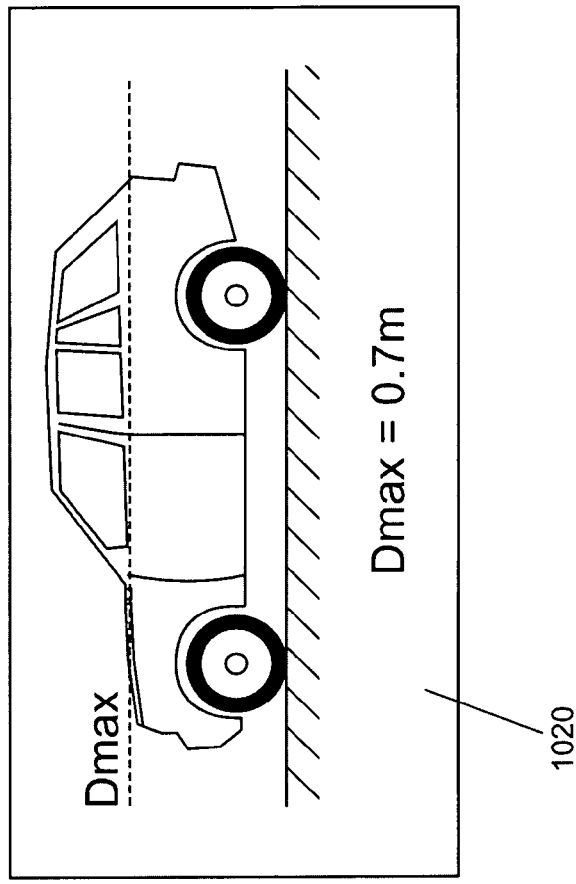
FIG. 4*a* is a view of the wading display of the vehicle of FIG. 1.
Figure 4:
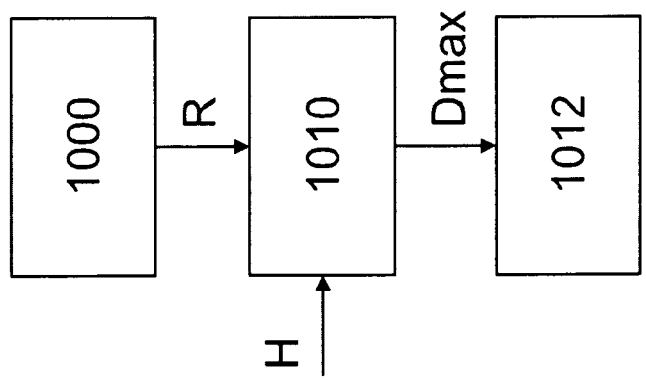
FIG. 4 is a flow chart of a method according to the an embodiment of the invention.

The vehicle 100 comprises an onboard ride height sensor (not shown) of known type. Turning to FIG. 4, a sequence of events according to an embodiment of the invention is shown. At step 1000 the vehicle ride height R is sensed using the known onboard sensors. The ride height R is then added to the known height H of the air intake orifice 112 relative to the bottom of the vehicle 100. This represents a safe maximum depth Dmax which is communicated to, and displayed on a driver information display at step 1012. A display 1020 is shown in FIG. 4*a* according to an embodiment of the invention. The driver can then use a measured depth D of water 120 (either by gauge or onboard depth measurement) to decide whether to proceed.

Figure 5:
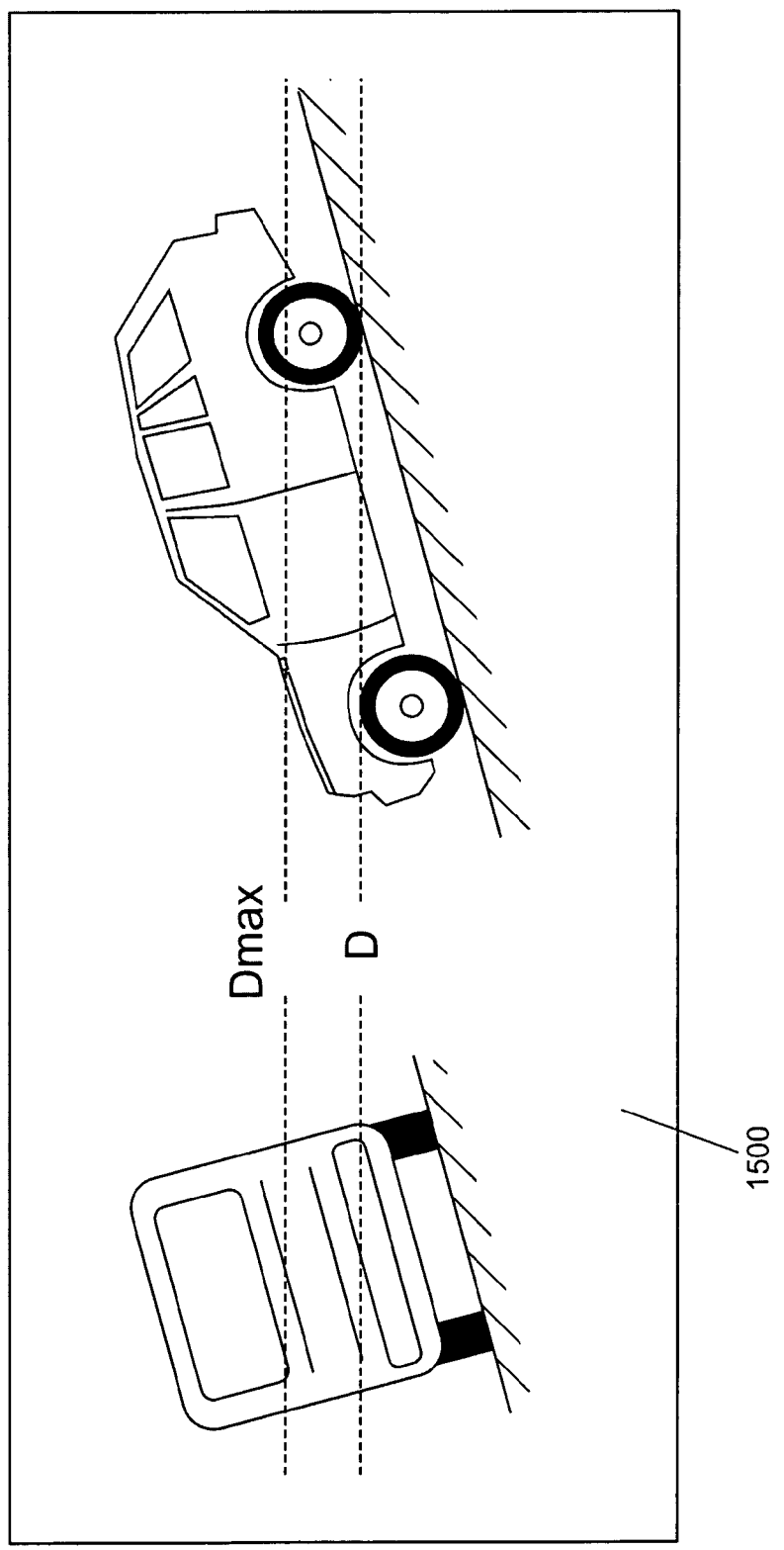
FIG. 5 is a view of a wading display according to an alternative embodiment of the invention.

In an alternative embodiment there is provided a display 1500 as illustrated in FIG. 5, in which the maximum wading depth Dmax is shown, as well as the current measured wading depth D (as measured by an on board water level sensor, e.g. a capacitive, resistive or hydrostatic sensor). Optionally, the display may also show the inclination of the vehicle 100 as measured by onboard tilt sensors. The driver then has an accurate depiction of the water level L at all positions on the vehicle 100. The actual wading depth D may be displayed alone.

Figure 6A:
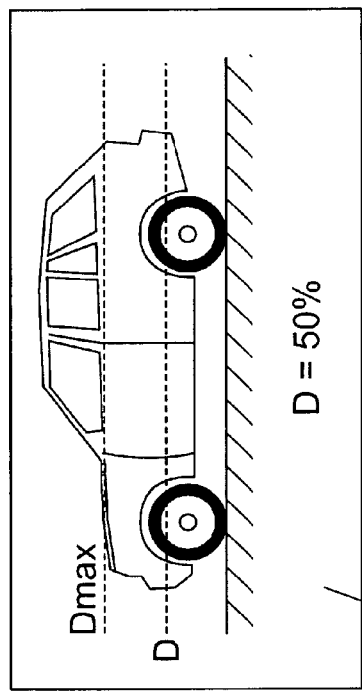
FIGS. 6*a* to 6*d* are views of the wading display of FIG. 4*a* in a plurality of states of depth in accordance with another embodiment of the invention.
Figure 6B:
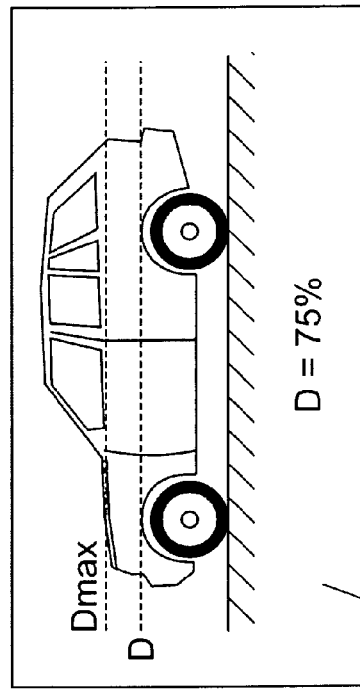
Figure 6C:
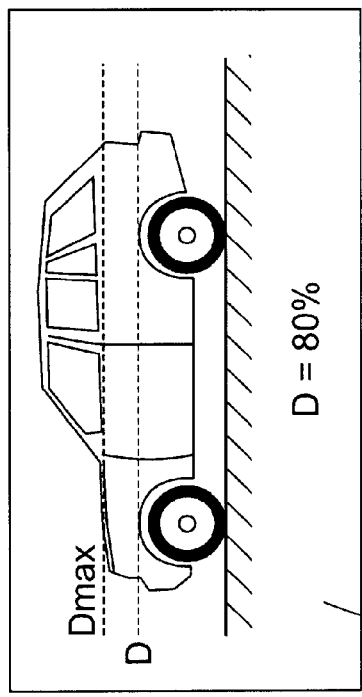
Figure 6D:
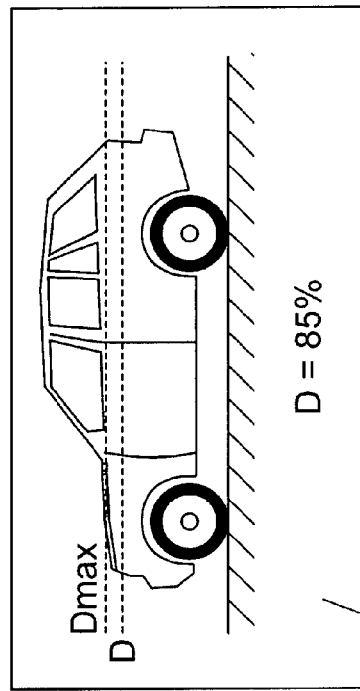

Turning to FIGS. 6a to 6d, a driver information display 1020 is shown in varying states. The display 1020 is connected to a computer memory having software configured to control the display output when run on an associated processor. The software controls the display 1020 by showing the wading depth D at a series of discrete levels. Referring to FIG. 6a, 50 percent depth is shown, 75 percent in FIG. 6b, 80 percent in FIG. 6c and 90 percent in FIG. 6d. As will be noted, the increment between each level becomes smaller towards 100 percent. In this example, the display is configured to have nine discrete states—25, 50 (FIG. 6a), 75 (FIG. 6b), 80 (FIG. 6c), 85 (FIG. 6d), 90, 95, 97.5 and 100 percent. Increments of 25 percent are suitable at low levels (the water level L is of little concern) decreasing to 2.5 percent at higher levels, where water 120 ingress is a risk.

Figure 7:
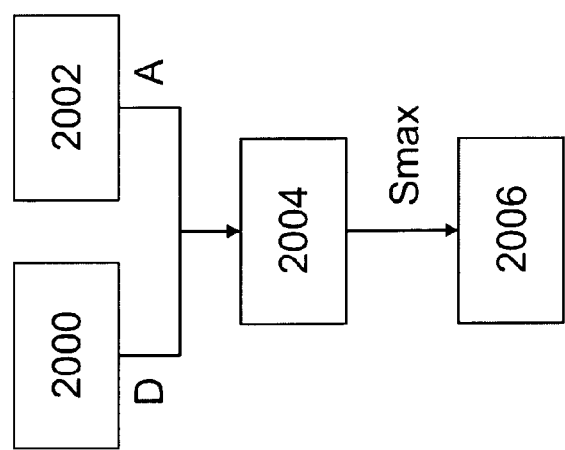
FIG. 7 is a flow chart of a method of calculating an advised maximum speed, in accordance with still another embodiment of the invention.

Turning to FIG. 7, there is illustrated another embodiment of the invention which provides a process for calculating an advised maximum wading speed is shown. At step 2000 the water depth D is measured using an onboard water depth measuring system. At step 2002, the vehicle inclination A is measured using an inclination transducer. At step 2004 depth D and vehicle inclination A are used to determine an advised maximum wading speed Smax which is displayed to the driver at step 2006. The maximum wading speed Smax is calculated to decrease with increased depth D, and decrease with increased inclination A. In one embodiment negative values of inclination A (when the vehicle 100 is travelling uphill) Smax increases as the vehicle 100 leaves the water 120.

Figure 8A:
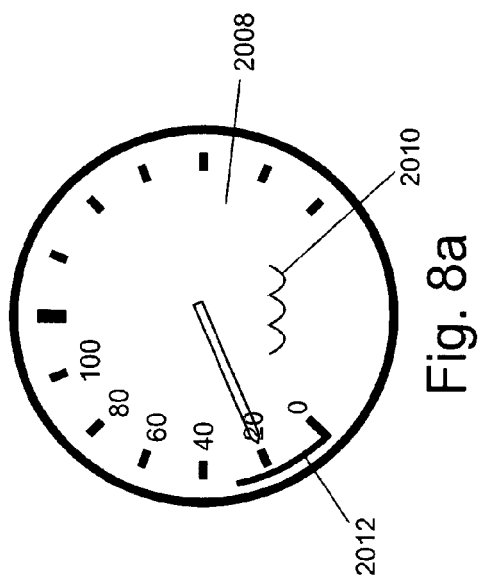
FIGS. 8*a* and 8*b* are alternative views of a display in accordance with the a further embodiment of the invention.
Figure 8B:
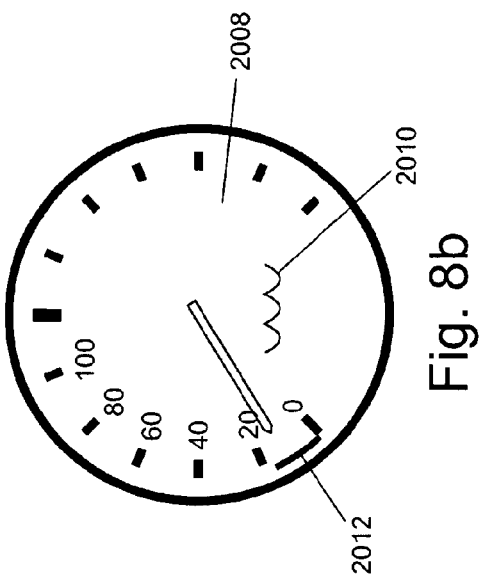

Referring to FIGS. 8a and 8b, an advised maximum speed display 2008 is shown.

The display 2008 is a speedometer displayed on a vehicle multi-function display. A wading indicator 2010 is provided which is illuminated if a wading event is detected. A safe speed range indicator 2012 is also illuminated which highlights a range of speeds (typically 0 to Smax) at which it is safe to travel without causing damage to surrounding objects or the vehicle 100 itself. In FIG. 8a Smax is calculated higher than in 8b. The indicator 2012 is represented by an arc extending around the speedometer dial, at the tip of the speedometer pointer.

FIGS. 9 to 25 illustrate embodiments of the invention, in particular there is illustrated a driver display for use in a vehicle 100 when wading. Information for causing the display to appear, to change, and to show information is provided by the sensors which indicate wading and depth of wading D, in particular an ultrasonic sensor such as PDC (parking distance control) sensors. A suitable electronic control system can utilize the outputs of such sensors to control a vehicle display 1020, 1500 in a generally well-known manner.

Figure 9:
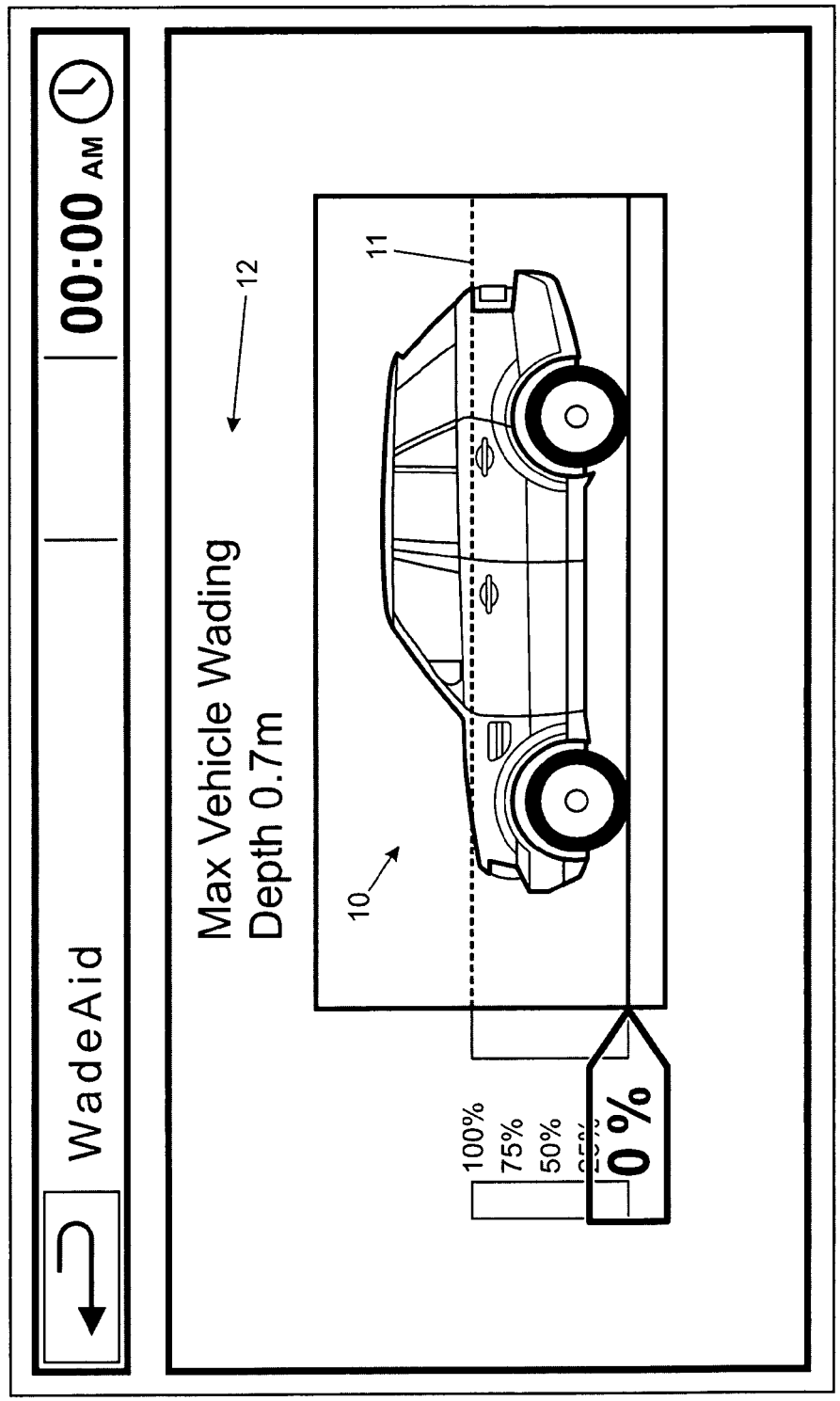
FIGS. 9-25 illustrate display formats for a driver display according to embodiments of the invention.

FIG. 9 shows a representation of a vehicle 10, a dotted line 11 indicating maximum wading depth; in the illustrated embodiment the maximum wading depth of the vehicle 10 is 0.7 m, and a text display 12 of maximum wading depth.

Figure 10:
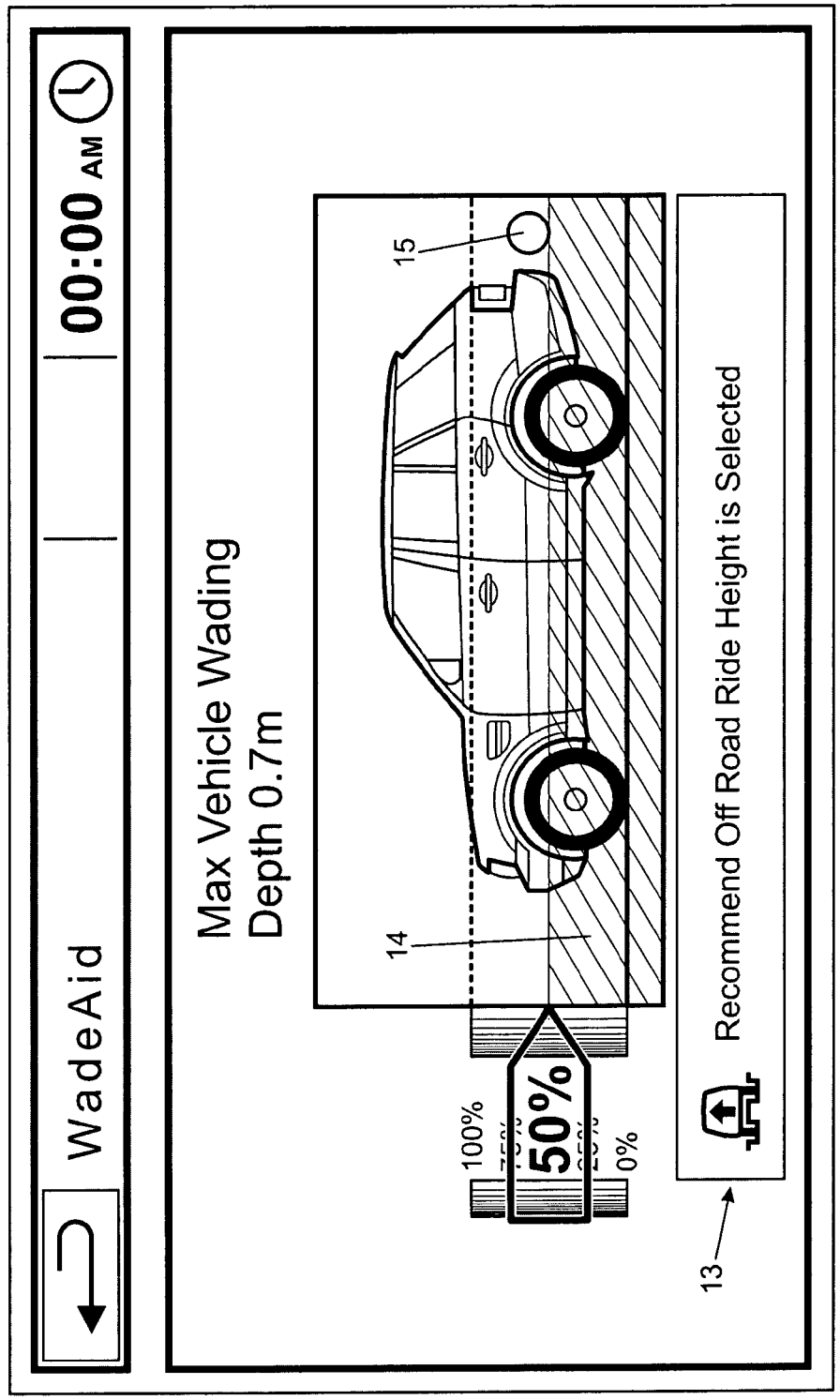

FIG. 10 corresponds to FIG. 9 and also illustrates an icon 13 indicating raised suspension, and a band 14 indicative of actual wading depth. The band 14 may comprise a colour wash. An icon 15 intuitively demonstrates water level, by appearing to float at the indicated level of water.

Figure 11:
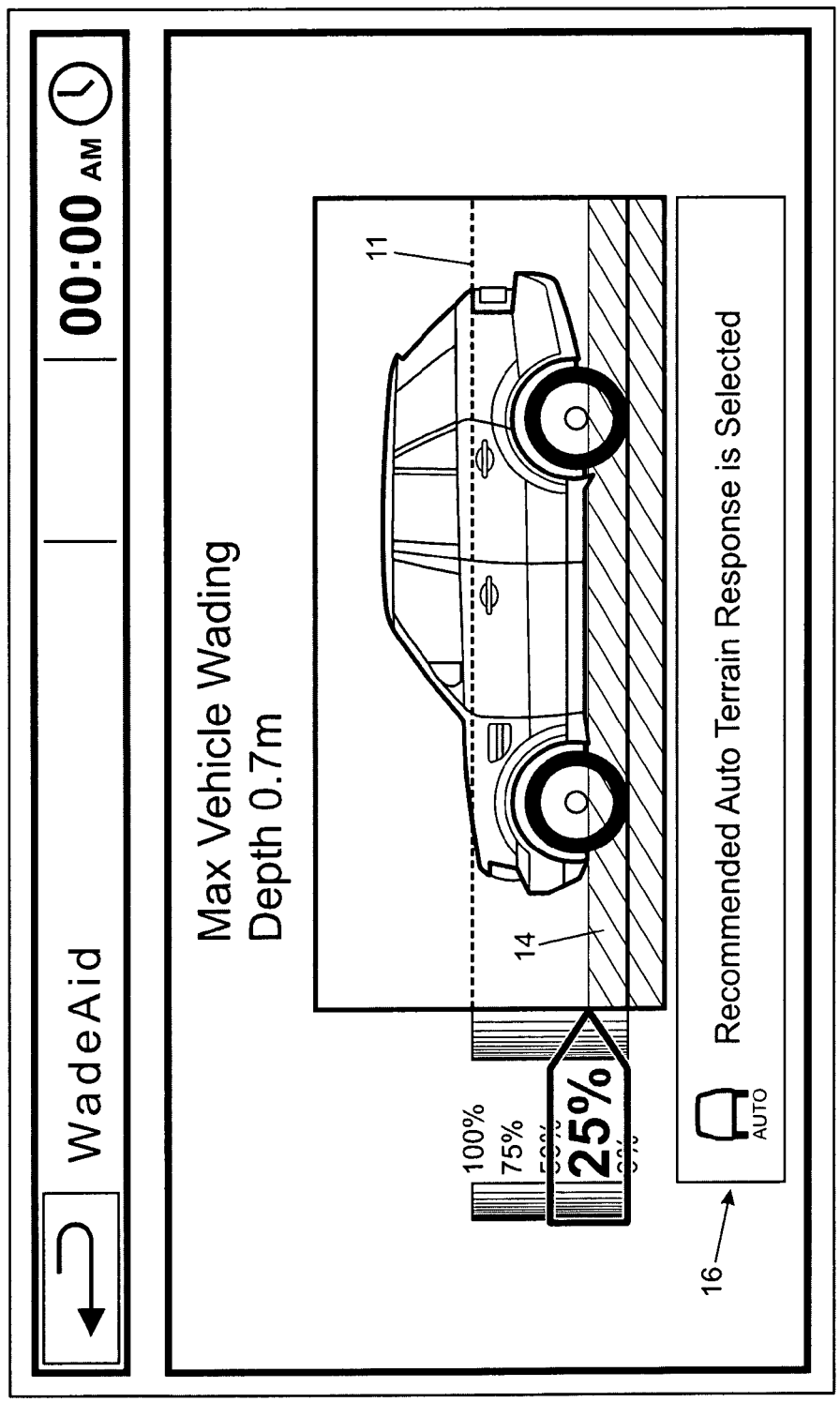

FIG. 11 shows a lower wading depth 14 corresponding with a normal height suspension setting, indicated by the icon 16.

Figure 12:
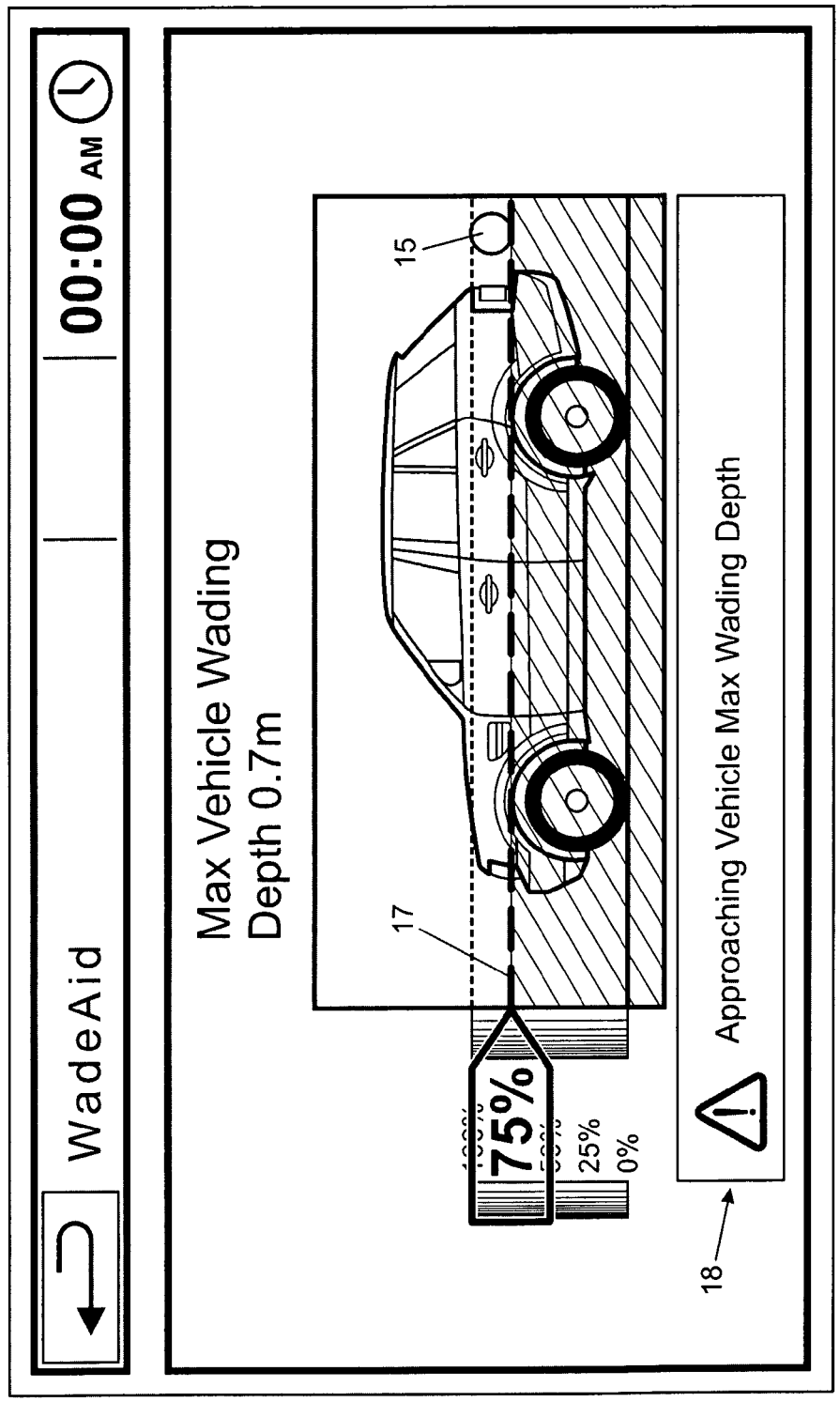

FIG. 12 shows a vehicle wading at a level indicated by the dotted line 17 with a colour wash below, for example a blue colour wash, and the duck icon 15. The line 17 raises and falls in real time according to actual water level. A caution icon 18 is also displayed.

Figure 13:
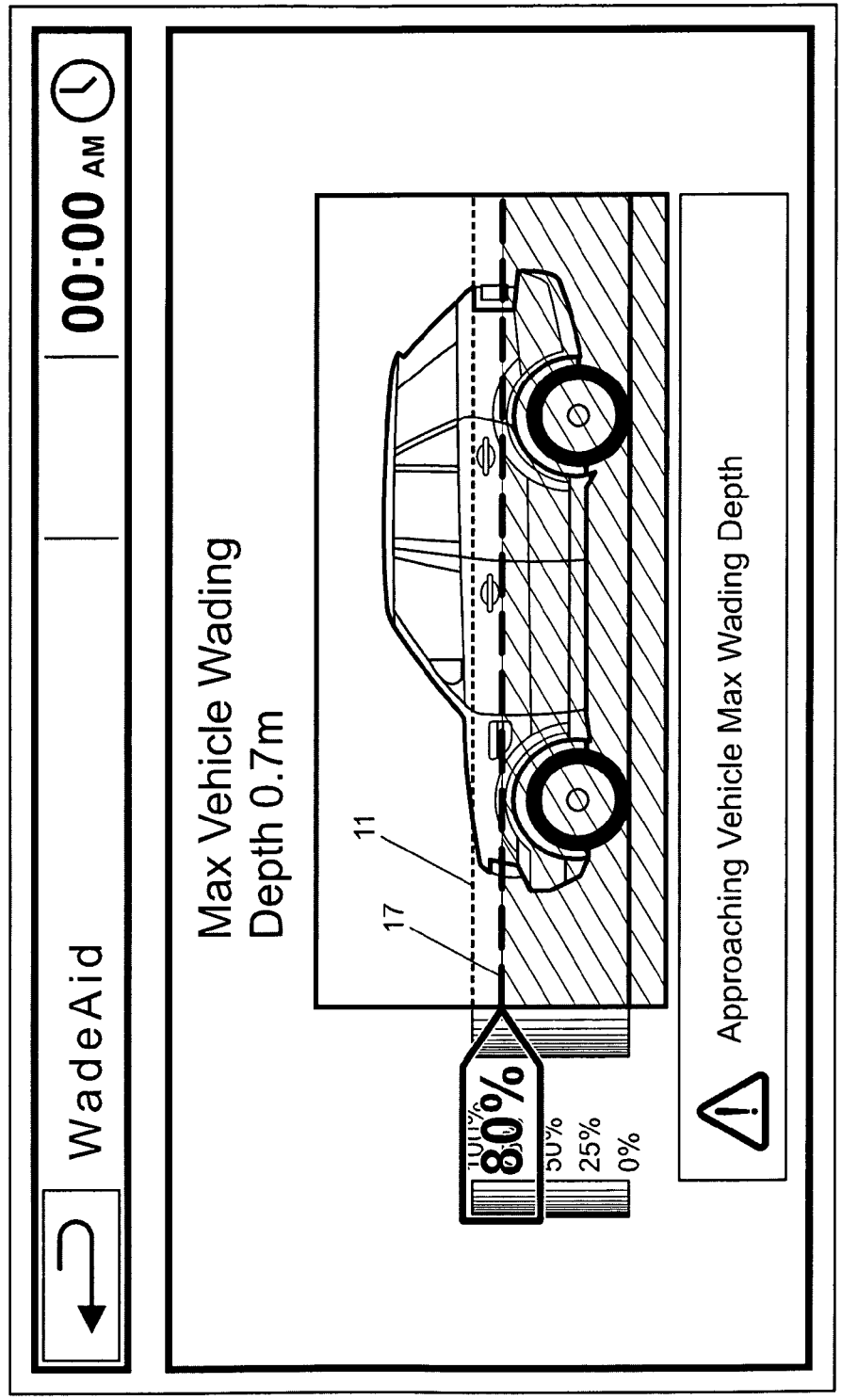

FIG. 13 illustrates a text indicator showing in text the percentage of maximum permissible depth of wading, in this case 80%, a dotted line at the 80% level, and a dotted line at the level of maximum permissible immersion.

Figure 14:
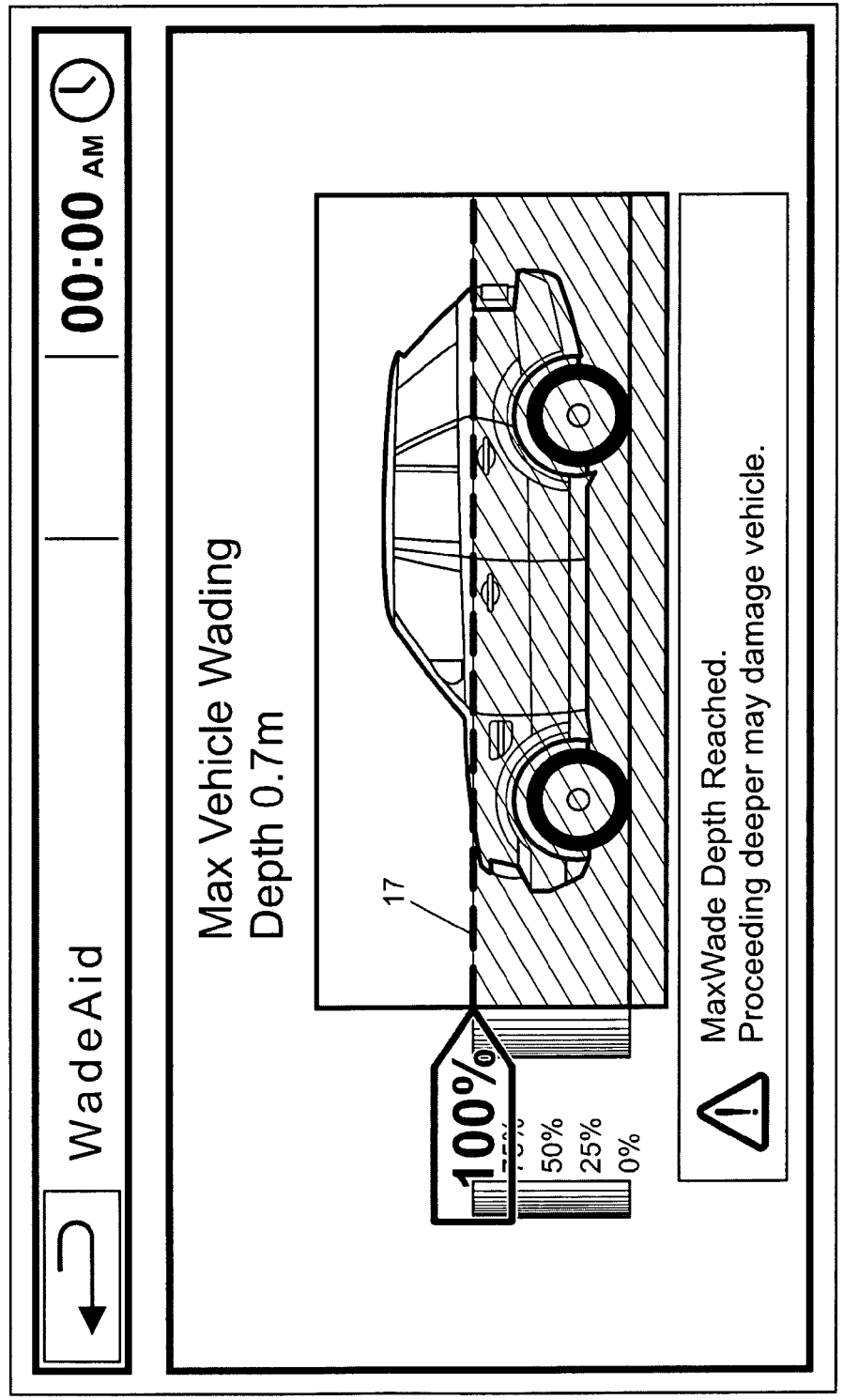

FIG. 14 shows a vehicle at maximum wading depth with the colour wash and dotted line 17 coinciding with the dotted line 11.

Figure 15:
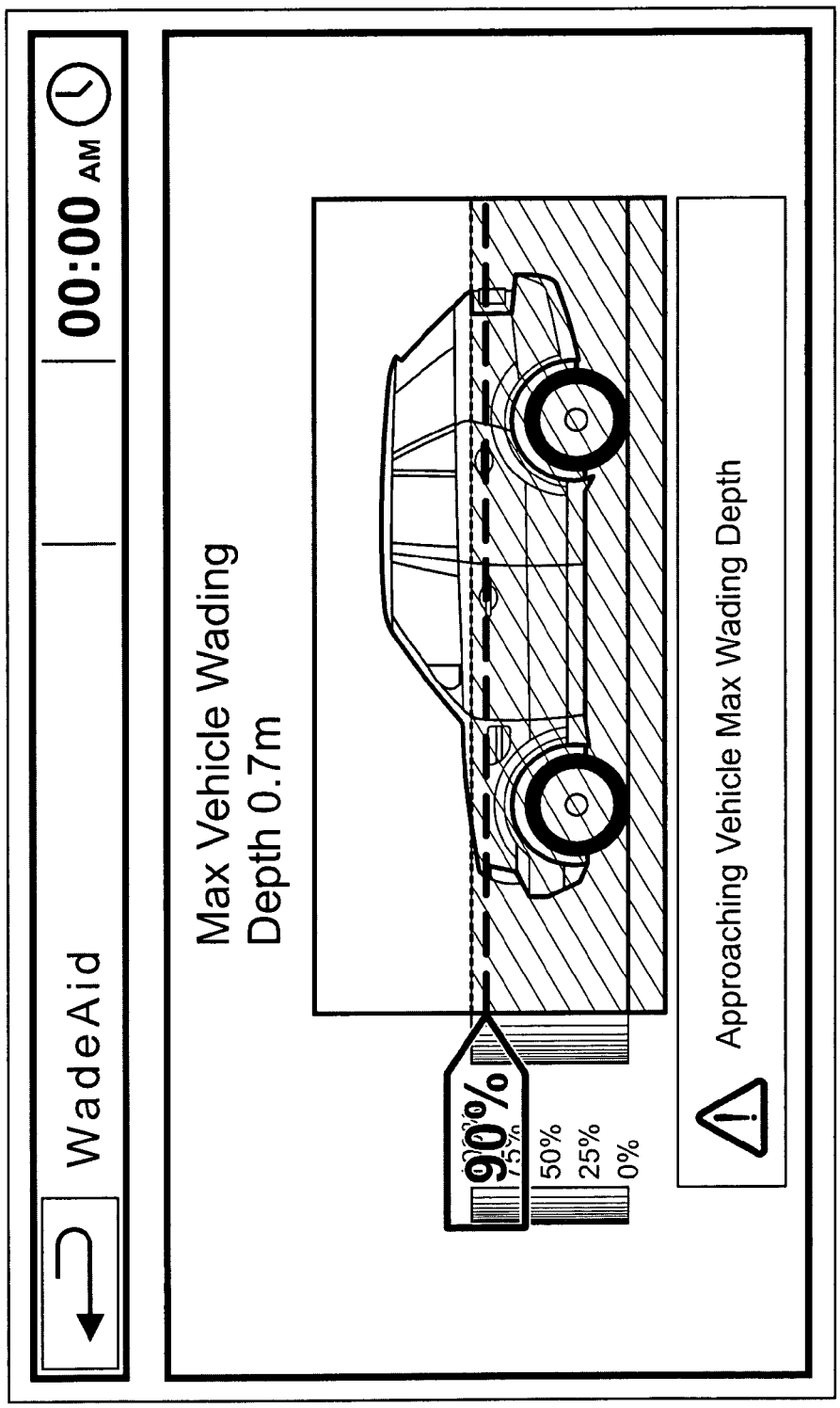

FIG. 15 corresponds to FIG. 13 and shows a vehicle at 90% of maximum wading depth.

Figure 16:
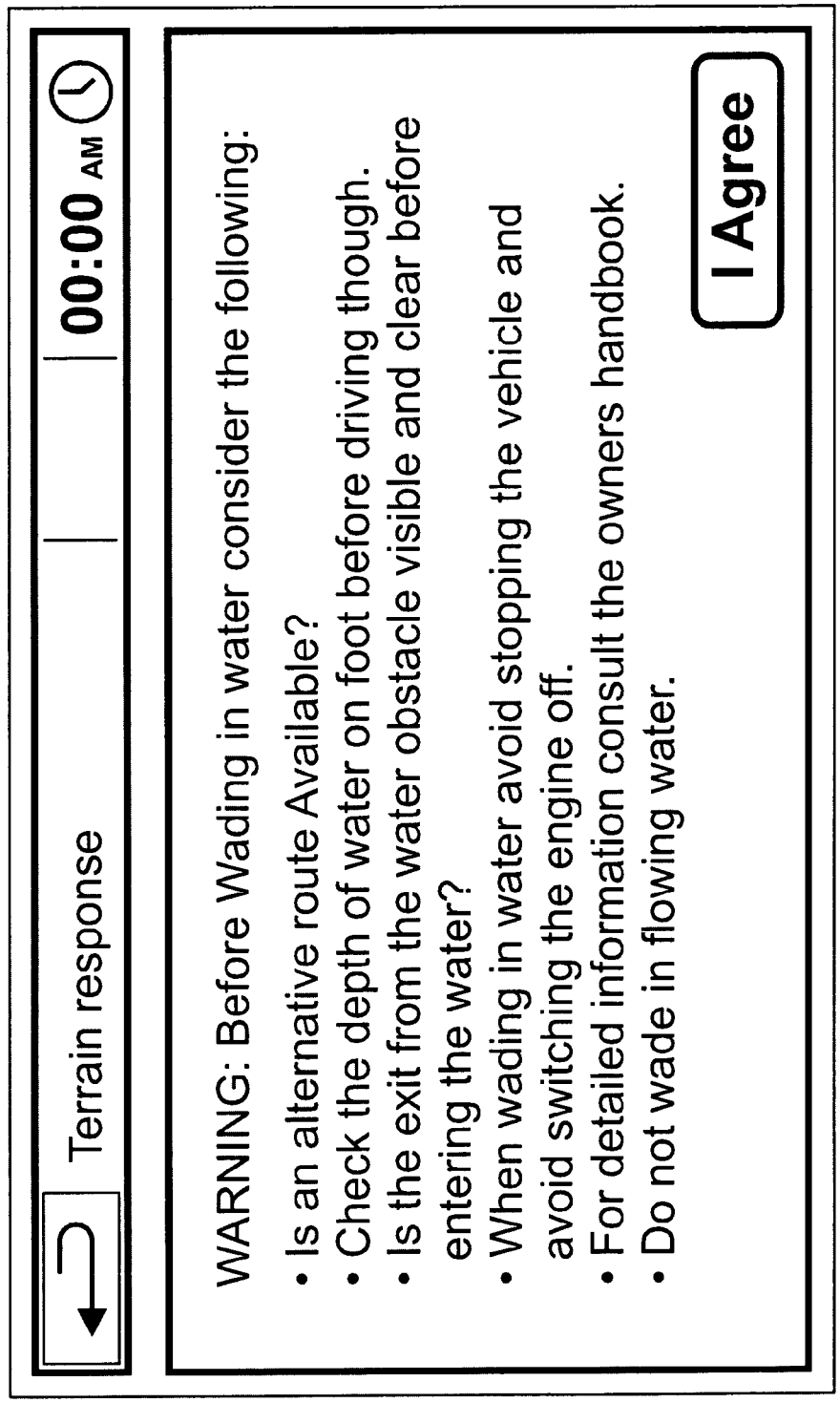
Figure 17:
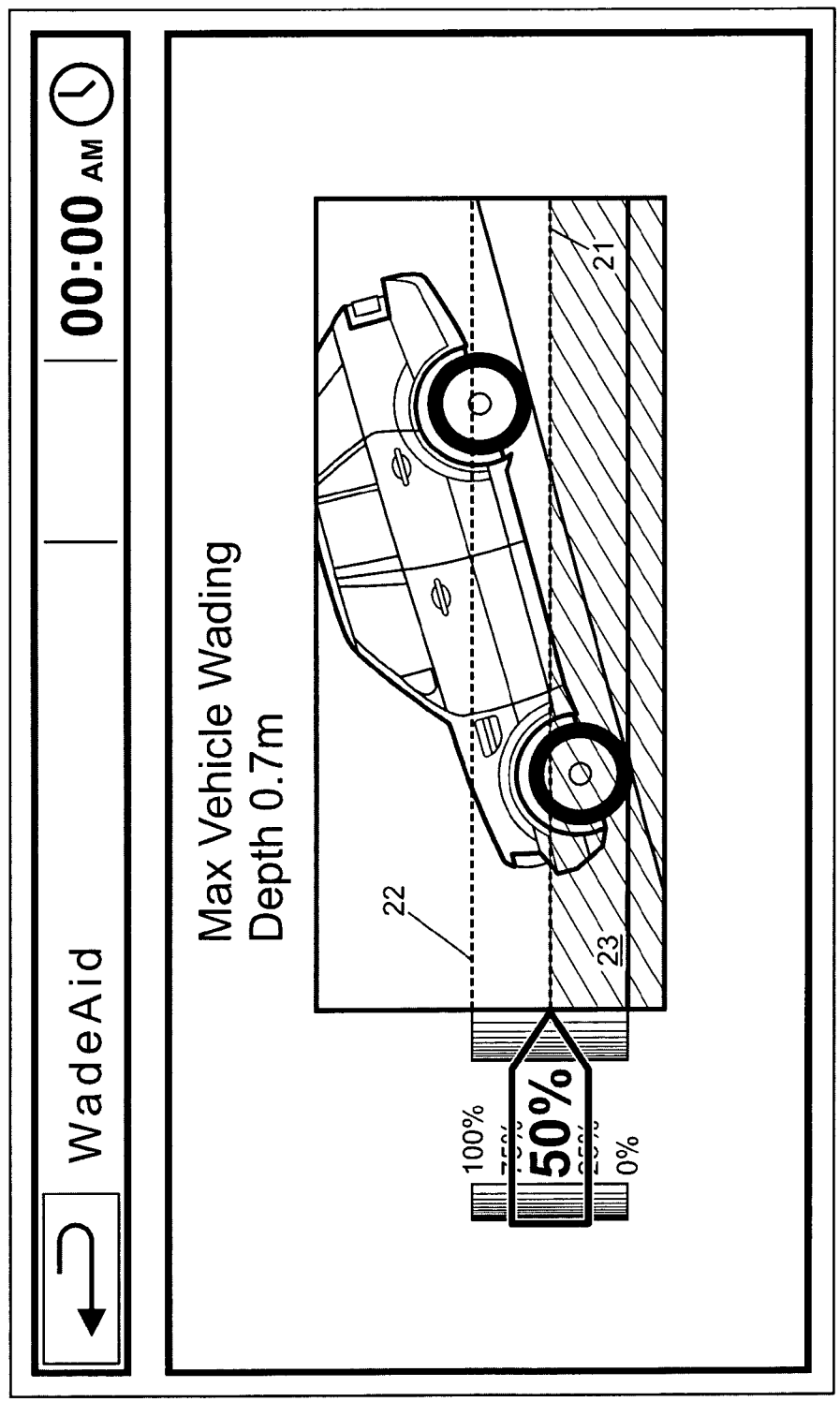

FIG. 16 illustrates a display for the vehicle driver upon detection of water at wading depth, and listing the following:

FIG. 17 illustrates a driver display with input from a vehicle inclination sensor, again showing actual depth 21, and maximum permissible depth 22. A colour wash 23 indicates water. The vehicle representation is shown at the detected inclination.

Figure 18:
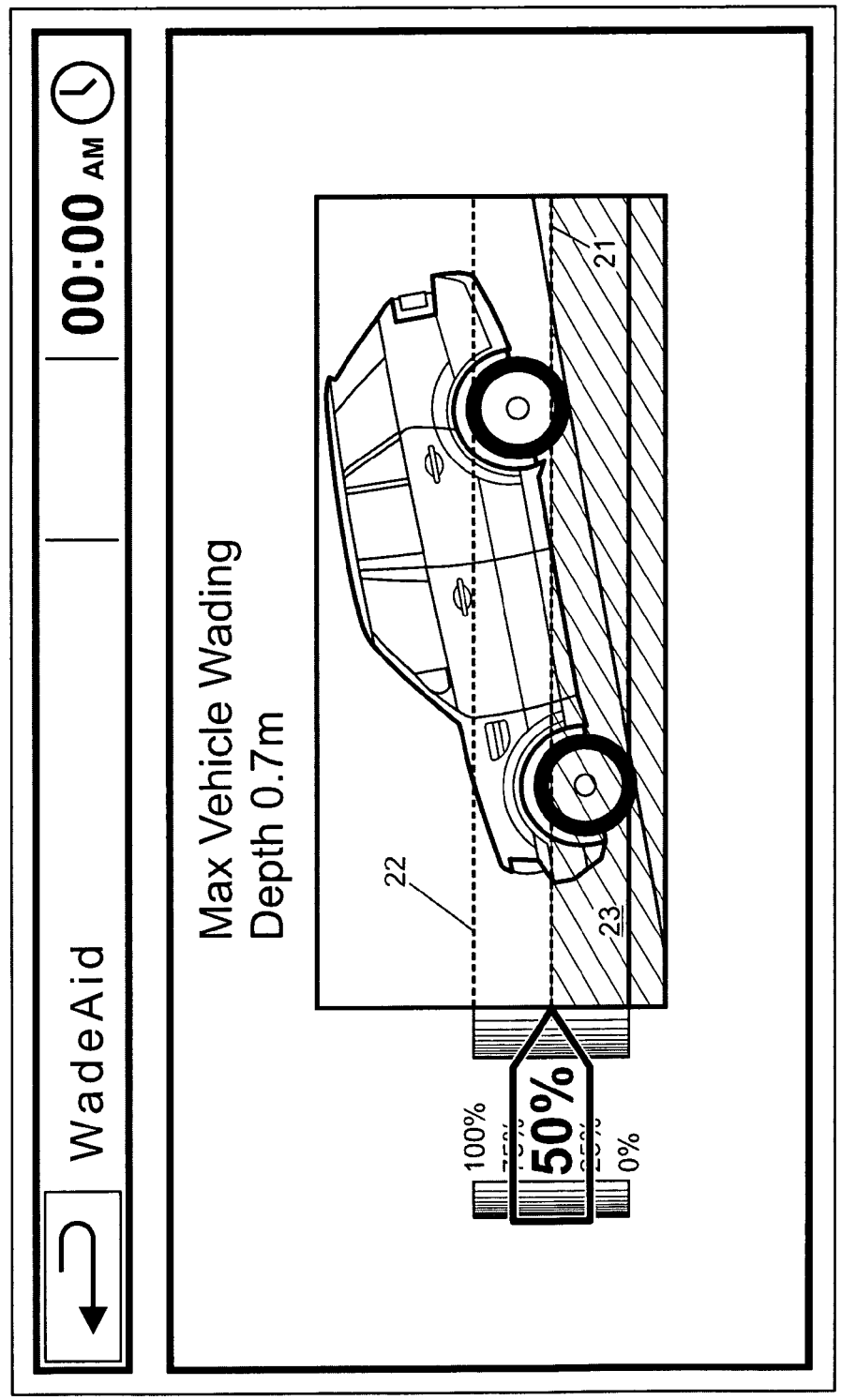

FIG. 18 shows a vehicle at a lesser slope than in FIG. 17.

Figure 19:
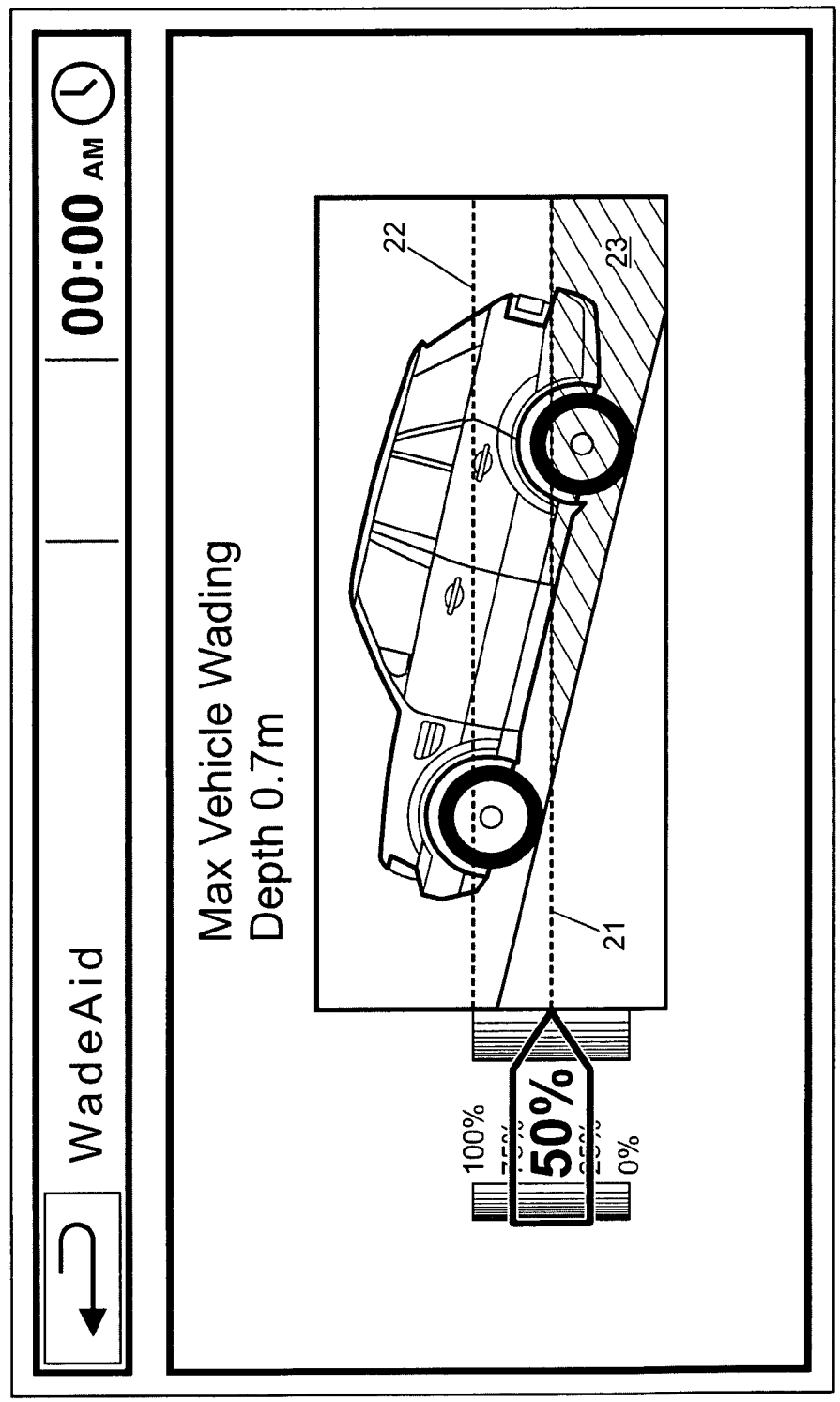

FIG. 19 shows a vehicle reversing into water, for example on a slip way, and utilizing rear facing parking sensors.

Figure 20:
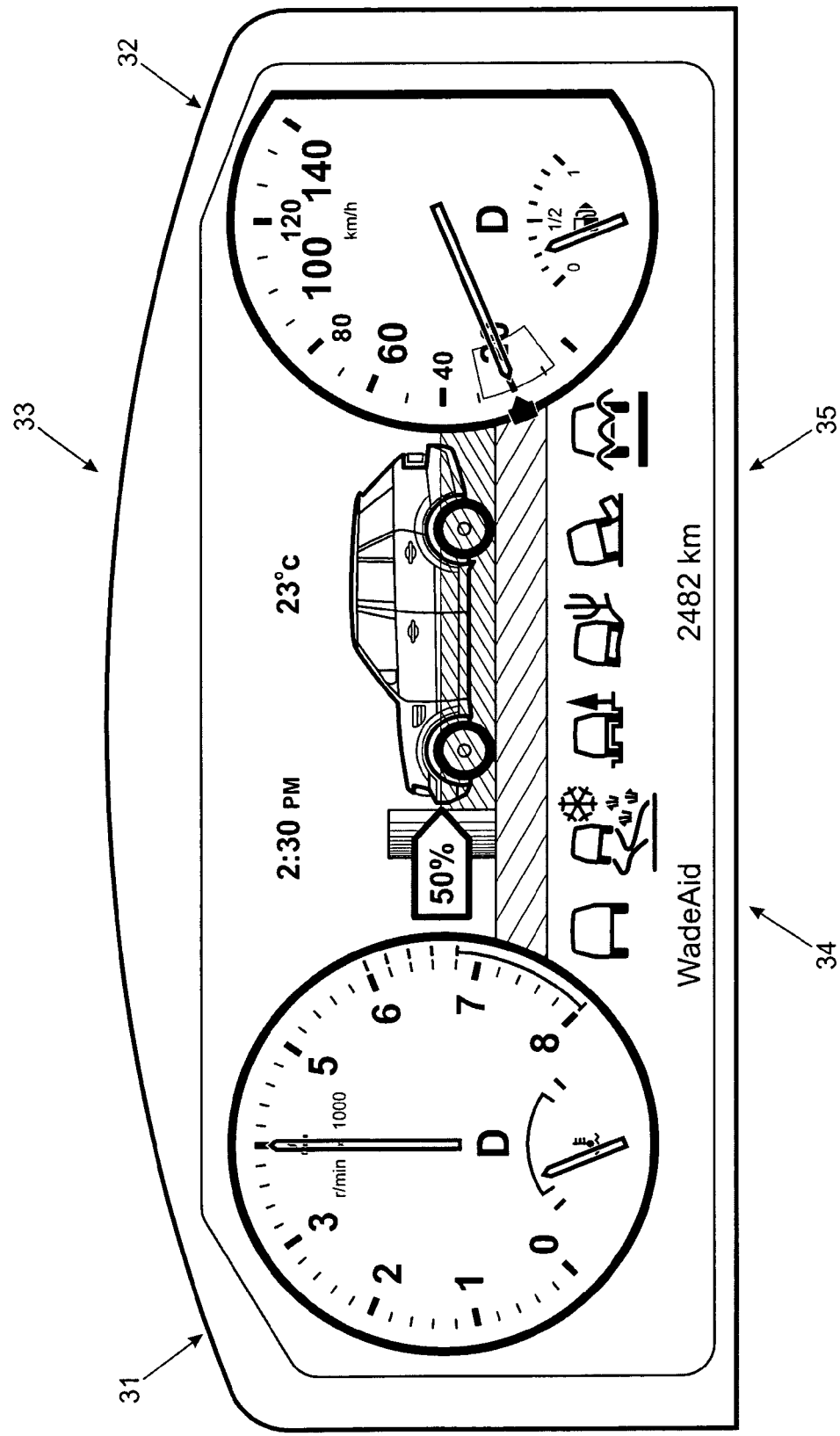

FIG. 20 shows a driver display having the usual speedometer 31 and rev counter 32. A vehicle representation 33, corresponding to FIGS. 1 to 11, is shown in the centre with a text indication of 'Wade Aid' 34.

Four different terrain response icons 35 are shown below the vehicle representation; the mode which is engaged (left most) being illuminated.

Figure 21:
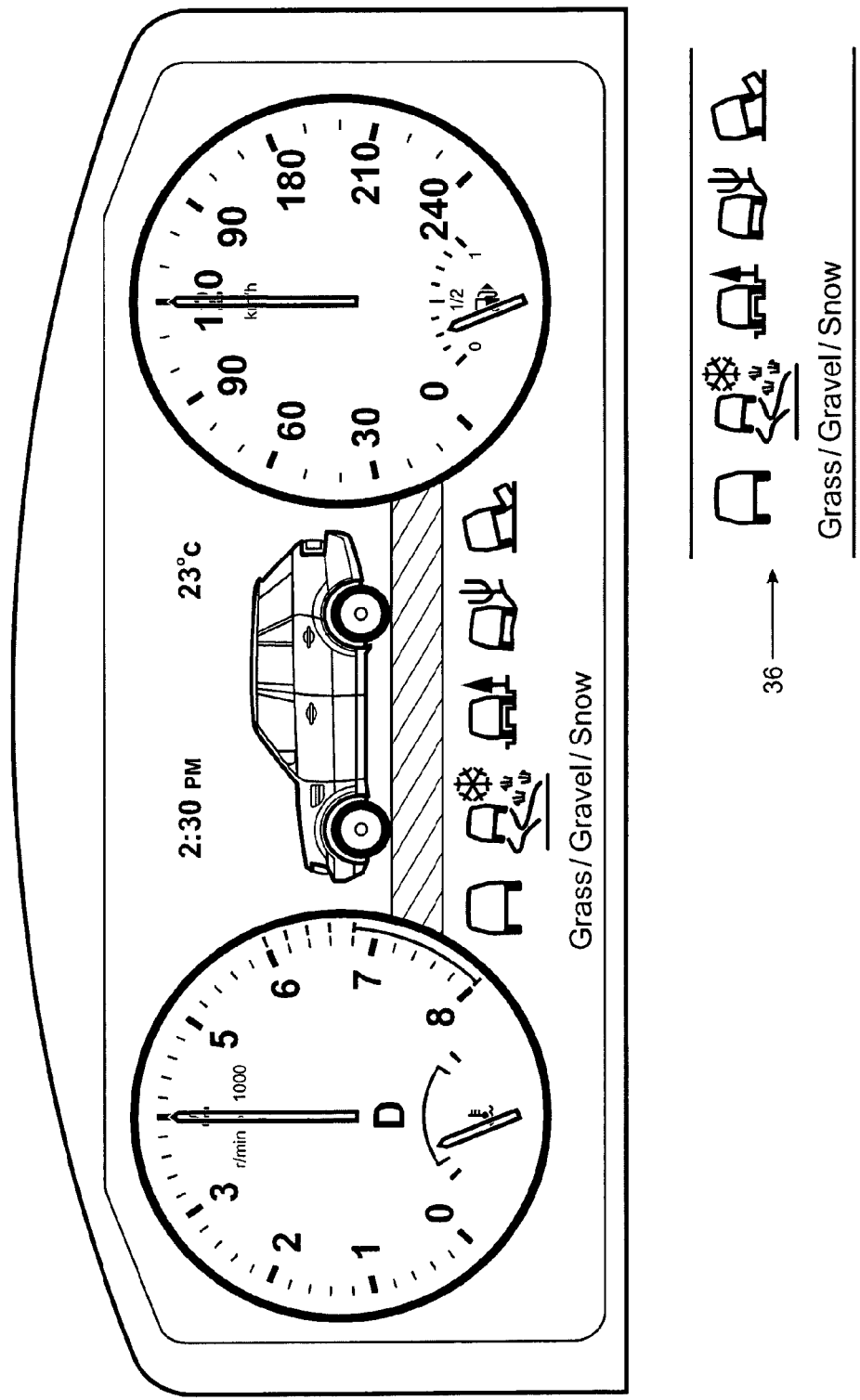

FIG. 21 shows the terrain response icons also in a separate panel 36.

Figure 22:
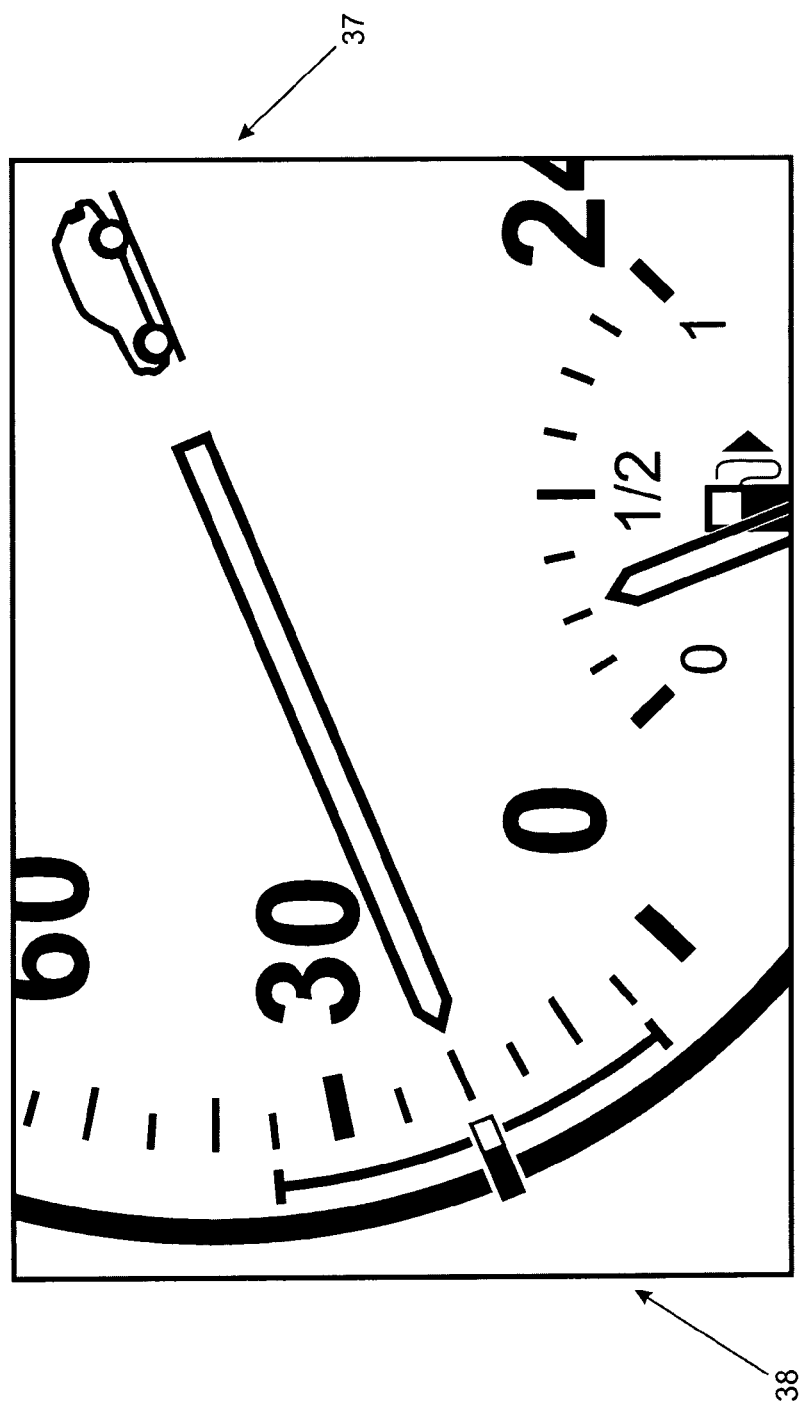

FIG. 22 shows an enlarged portion of the speedometer, an icon 37 indicating descent, and a restricted speed range 38 as an arc around the outside of the speed graduations (in this case extending from 5-35 kph).

Figure 23:
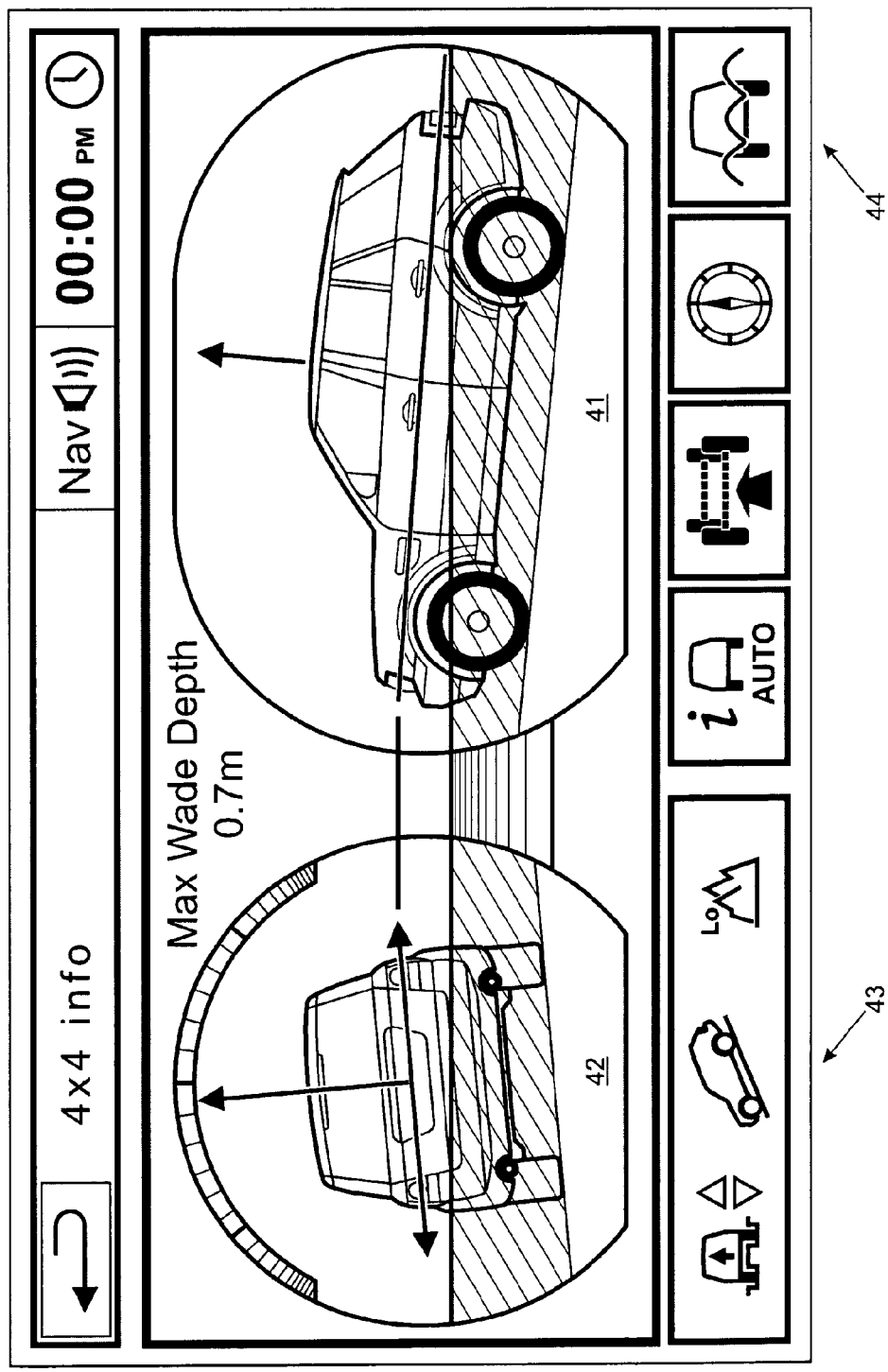
Figure 24:
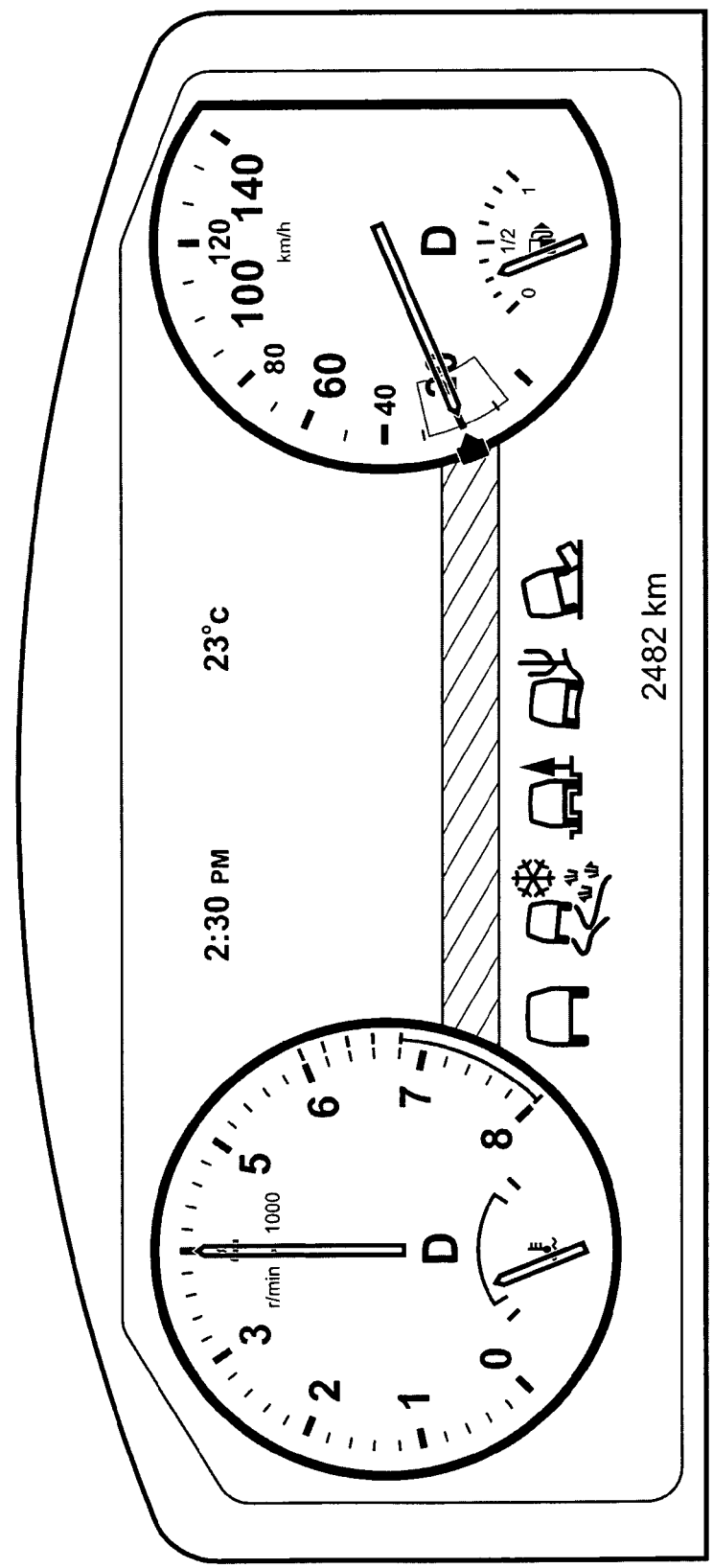
Figure 25:
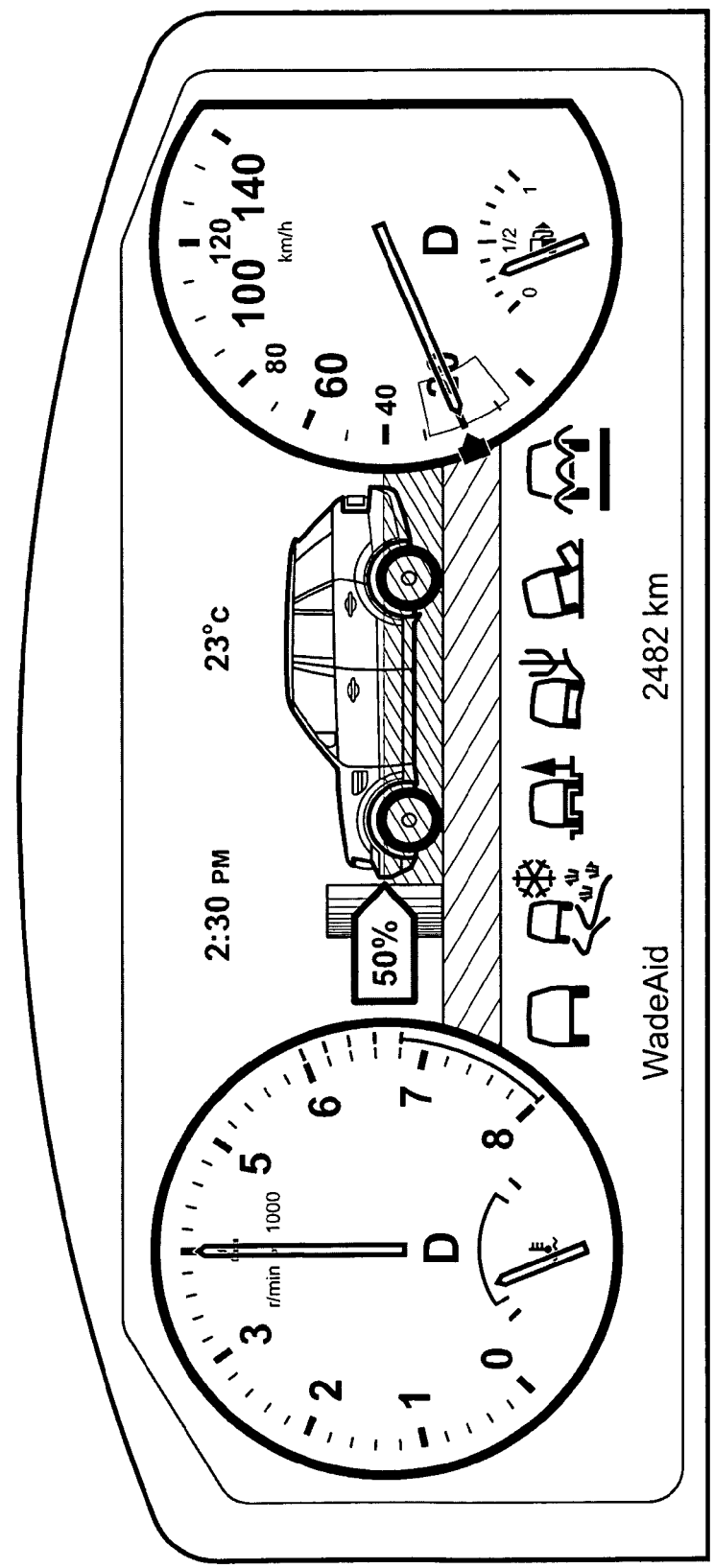

FIG. 23 shows vehicle representations from the side 41 and from one end 42, indicating water level corresponding to vehicle inclination fore and aft, and side to side. An arrow above the vehicle shows nominal deviation from vertical. The vehicle has greater immersion at the rear, and accordingly a rear vehicle view is illustrated. A front view is shown when the front has greater immersion. A lower strip of icons indicate the state of vehicle functions, and include raised suspension 43 and wading 44.

The present application claims priority to UK patent application numbers filed by the present applicant on 15 Dec. 2010 having the application numbers GB1021268.6, GB1021278.5, GB1021272.8, GB1021297.5, GB1021295.9 and GB1027296.7, the contents of each of which are expressly incorporated by reference in their entirety.

The present application is related to the PCT applications, filed concurrently with the present application, and naming at least one inventor in common with the present application, which are listed below:

1. PCT application No. PCT/EP2011/072998 to Thuy-Yung TRAN and Edward HOARE filed 15 Dec. 2011, entitled "Ultrasonic Wading Detection System for a Vehicle";

2. PCT application No. PCT/EP2011/072999 to Thuy-Yung TRAN and Edward HOARE, filed 15 Dec. 2011, entitled "Wading Detection System for a Vehicle";

3. PCT application No. PCT/EP2011/072986 to Thuy-Yung TRAN, Edward HOARE and Nigel CLARKE, filed 15 Dec. 2011, entitled "Vehicle Control System";

4. PCT application No. PCT/EP2011/072997 to Thuy-Yung TRAN, Edward HOARE and Nigel CLARKE, filed 15 Dec. 2011, entitled "Wading Depth Estimation For A Vehicle";

5. PCT application No. PCT/EP2011/072988 to "Thuy-Yung TRAN, Edward HOARE and Nigel CLARKE", filed 15 Dec. 2011, entitled "Wading Vehicle Depth Measurement Apparatus";

6. PCT application No. PCT/EP2011/072990 to Thuy-Yung TRAN, Edward HOARE and Nigel CLARKE, filed 15 Dec. 2011, entitled "Vehicle Orientation Device and Method";

7. PCT application No. PCT/EP2011/072991 to Thuy-Yung TRAN, Edward HOARE and Nigel CLARKE, filed 15 Dec. 2011, entitled "Wading Vehicle Depth Measurement Apparatus";

8. PCT application No. PCT/EP2011/072992 to Thuy-Yung TRAN, Edward HOARE, Anthony JONES, Simon THOMSON and Ashutosh TOMAR, filed 15 Dec. 2011, entitled "Wading Vehicle Water Level Display";

9. PCT application No. PCT/EP2011/072996 to Thuy-Yung TRAN, Edward HOARE, Anthony JONES, Simon THOMSON and Ashutosh TOMAR, filed 15 Dec. 2011, entitled "Wading Vehicle Advisory Speed Display".

The contents of the above referenced PCT applications (and corresponding UK applications, filed concurrently and having the same ownership, inventorship and Title as the above listed PCT applications) are hereby expressly incorporated by reference in their entirety into the present application.

The invention claimed is:

1. A method comprising:
    determining a current wading depth (D) from ground level of a vehicle using a wading sensor; and
    displaying on a driver display in the vehicle a representation of an elevation view of the vehicle on which is superimposed the current wading depth (D).

2. A method according to claim 1, further comprising calculating a maximum wading depth (Dmax) of the vehicle according to a ride height thereof, and displaying on said elevation of the vehicle a superimposed indication of maximum wading depth.

3. A system for a vehicle comprising:
    a memory and a processor; and
    a driver display in the vehicle,
    wherein the memory contains a program configured to run on the processor to determine a current water depth (D) from ground level, and to control the display to display thereon a representation of an elevation view of a vehicle and a wading depth indicator, said display being arranged to show the current water depth (D) from ground level on said elevation view of the vehicle.

4. The system according to claim 3, wherein the program when run on the processor is configured to to calculate a maximum wading depth (Dmax) of the vehicle from a vehicle ride height and to display the maximum wading depth on said display.

5. The system of claim 4, wherein a line indicative of maximum wading depth (Dmax) is superimposed on said elevation and wherein the position of said line indicative of maximum wading depth on said elevation changes according to a selected ride height.

6. The system of claim 4, wherein maximum wading depth (Dmax) and current water level are simultaneously displayed.

7. The system of claim 4, wherein current water depth (D) is indicated by a color wash.

8. The system of claim 4, further including a vehicle inclination sensor, said display showing the elevation at a real-time inclination with respect to the current water depth (D) and wherein said display is adapted to indicate vehicle inclination in pitch and roll.

9. The system of claim 3, wherein the water depth (D) from ground level is displayed in increments which decrease as the water depth (D) approaches a maximum wading depth (Dmax).

10. A system for a vehicle comprising a display configured to display an elevation of a vehicle and a wading depth indicator, said display being arranged to show the current water depth (D) from ground level on said elevation, further comprising a memory and a processor, the memory containing a program configured to run on the processor to calculate a maximum wading depth (Dmax) of the vehicle from a vehicle ride height and to display the maximum wading depth on said display, further including a vehicle inclination sensor, said display showing the elevation at a real-time inclination with respect to the current water depth (D) and wherein said display is adapted to indicate vehicle inclination in pitch and roll, wherein said display includes a side elevation and/or an end elevation of a vehicle, wherein the end elevation displayed is the lower end and/or wherein the side elevation displayed is the lower side.

11. A vehicle comprising a sensor for determining the wading depth of the vehicle and a system according to claim 3.

* * * * *